United States Patent
Kelly et al.

(10) Patent No.: US 9,797,289 B2
(45) Date of Patent: Oct. 24, 2017

(54) INTEGRATED ENGINE EXHAUST AND HEAT PROCESS FLEXIBLE AND LOW EMISSIONS COMBINED HEAT AND POWER PROCESS AND SYSTEM

(71) Applicant: Altex Technologies Corporation, Sunnyvale, CA (US)

(72) Inventors: John T. Kelly, Saratoga, CA (US); Carlo Castaldini, Sunnyvale, CA (US); Mehdi Namazian, Palo Alto, CA (US)

(73) Assignee: ALTEX TECHNOLOGIES CORPORATION, Sunnyvale, CA (US)

( * ) Notice: Subject to any disclaimer, the term of this patent is extended or adjusted under 35 U.S.C. 154(b) by 191 days.

(21) Appl. No.: 14/714,119

(22) Filed: May 15, 2015

(65) Prior Publication Data

US 2015/0247440 A1    Sep. 3, 2015

Related U.S. Application Data

(63) Continuation of application No. 13/157,625, filed on Jun. 10, 2011, now Pat. No. 9,062,579.

(Continued)

(51) Int. Cl.
*F01N 3/10* (2006.01)
*F01N 5/04* (2006.01)
*F01N 5/02* (2006.01)

(52) U.S. Cl.
CPC ............... *F01N 5/04* (2013.01); *F01N 3/10* (2013.01); *F01N 5/02* (2013.01); *Y02T 10/16* (2013.01)

(58) Field of Classification Search
CPC ................. F01N 3/10; F01N 5/02; F01N 5/04
(Continued)

(56) References Cited

U.S. PATENT DOCUMENTS 2,621,475 A    12/1952 Loy
5,794,431 A    8/1998 Utamura et al.
(Continued)

FOREIGN PATENT DOCUMENTS

JP    02-230916    9/1990
JP    2009-293618    12/2009

*Primary Examiner* — Steven Sutherland
(74) *Attorney, Agent, or Firm* — Squire Patton Boggs (US) LLP

(57) ABSTRACT

The invention provides systems and methods for electric power production and integrated combustion and emissions control. The invention may include an engine capable of receiving air and fuel, and producing power and an engine exhaust gas. The invention may also include a first reaction zone receiving the engine exhaust gas from the engine configured to combust fuel and air having an equivalence ratio of more than one, thereby generating a first product. The combustion may reduce nitrogen containing species. The invention may also include a second reaction zone receiving the engine exhaust gas from the engine configured to combust fuel and air having an equivalence ratio of less than one, thereby generating a second product. The combustion may reduce or minimize NOx. The invention may also include a mixing zone configured to receive the first product and second product, and mix and react the first and second products, thereby generating an exhaust with reduced NOx levels. This may occur with sufficient residence time and temperature to complete combustion and promote nitrogenous species reduction reactions. For inventions with multiple zones, fuel or air or exhaust gas may be adjusted, diverted or turned off as load is reduced to maintain flame stability for all zones that remaining operational. For inventions with engine exhaust that provides less oxidant than the burner requires, an air eductor means may be arranged between the engine and the burner that entrains (Continued)

needed additional oxidant and simultaneously recovers the flow energy in the turbine exhaust.

26 Claims, 14 Drawing Sheets

Related U.S. Application Data

(60) Provisional application No. 61/354,167, filed on Jun. 11, 2010.
(58) Field of Classification Search
USPC .............. 60/733, 39.5, 39.52; 431/10, 12
See application file for complete search history.

(56) References Cited

U.S. PATENT DOCUMENTS

| | | |
|---|---|---|
| 5,906,806 A | 5/1999 | Clark |
| 6,000,930 A | 12/1999 | Kelly et al. |
| 6,485,289 B1 | 11/2002 | Kelly et al. |
| 6,735,953 B1 | 5/2004 | Wolfe et al. |
| 7,188,603 B1 * | 3/2007 | Tsuji ................ F01N 3/10 |
| | | 123/326 |
| 7,503,178 B2 | 3/2009 | Bucker et al. |
| 2007/0044778 A1 | 3/2007 | Milovanovic et al. |
| 2010/0006067 A1 | 1/2010 | Pagot et al. |
| 2013/0031910 A1 * | 2/2013 | Merchant .......... B01D 53/8631 |
| | | 60/772 |

\* cited by examiner

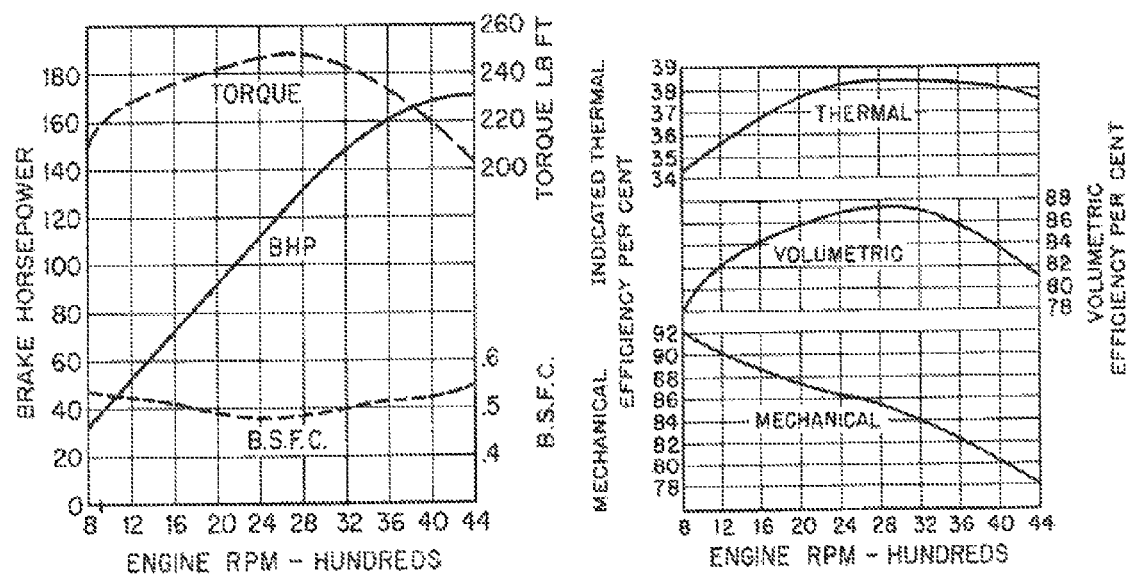
FIG. 1 – Typical Performance Characteristics Versus Engine Speed/Throughput For a Spark Ignition Engine

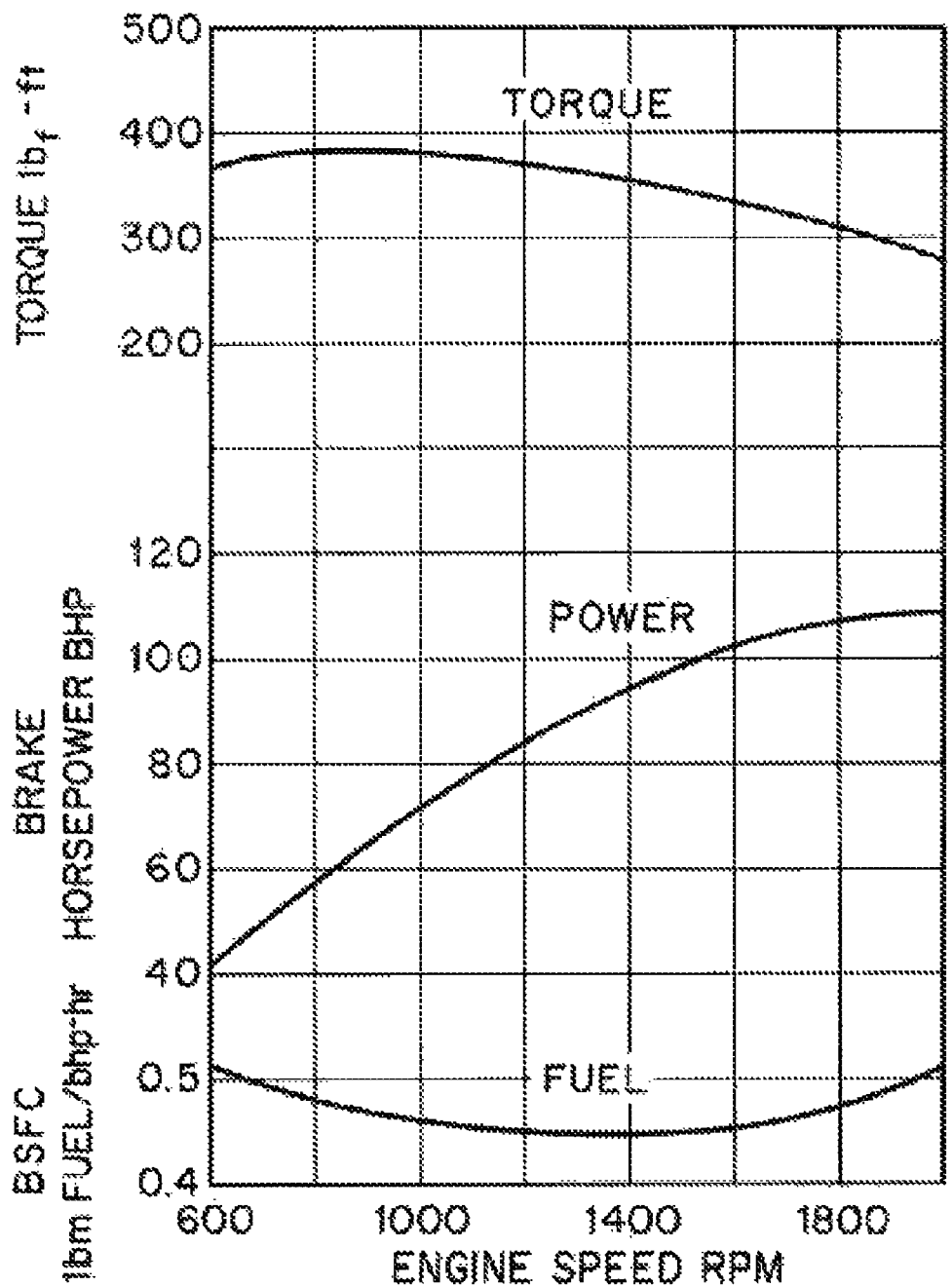
FIG. 2 – Compression Ignition Engine Typical Performance Characteristics with Engine Speed

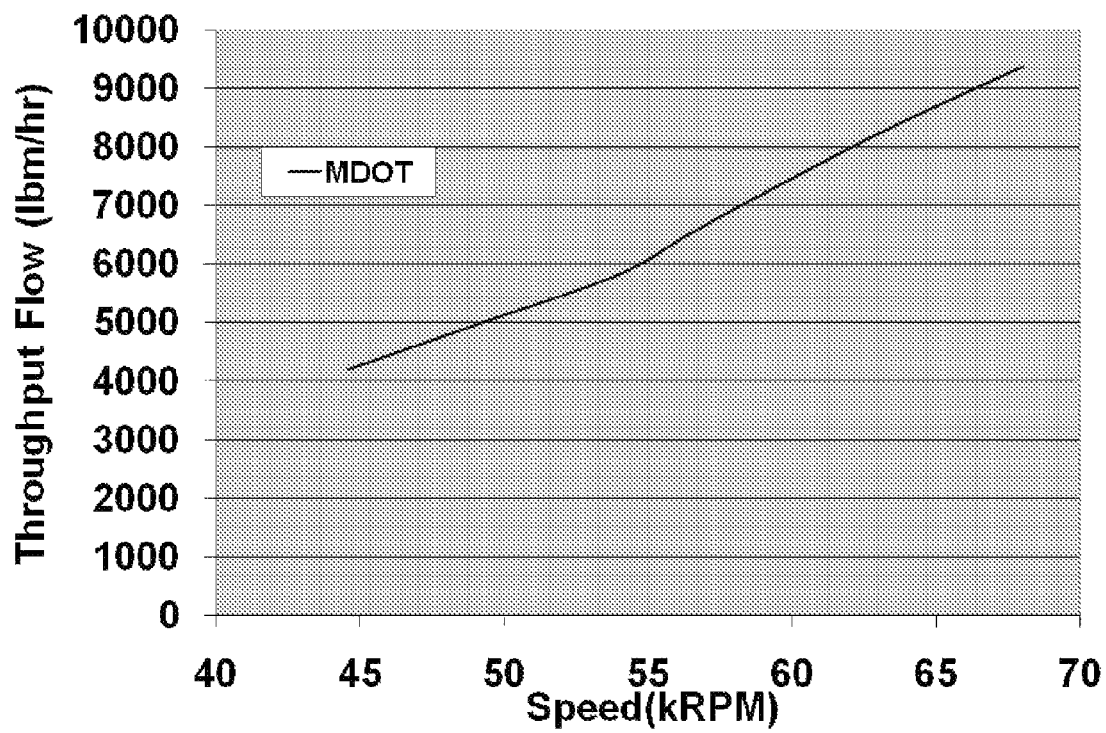
FIG. 3 – Gas Turbine Typical Engine Flow Variation with Engine Speed
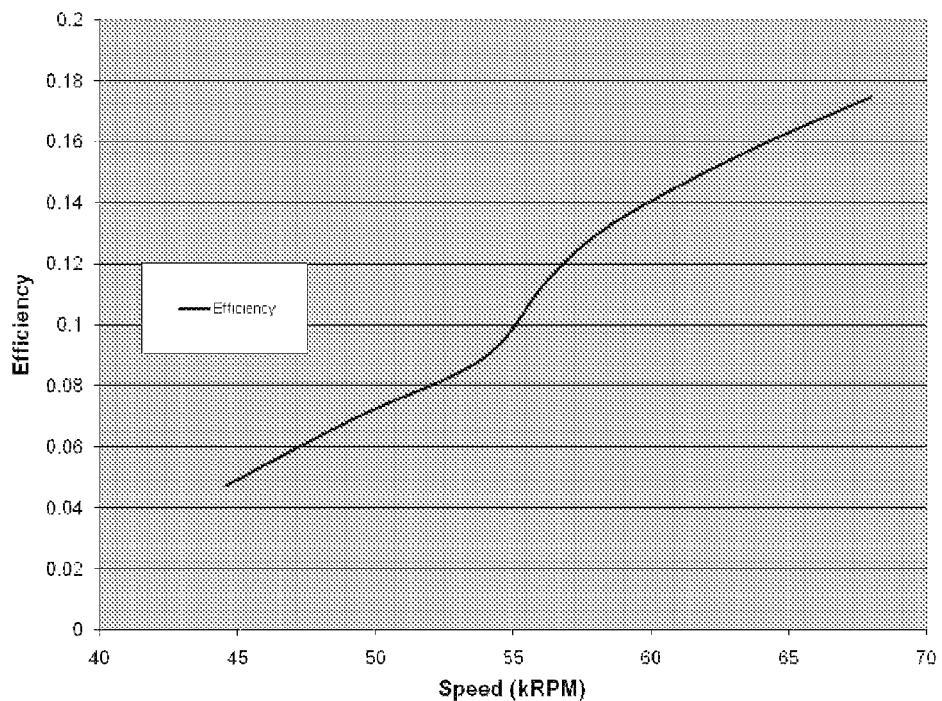
FIG. 4 – Gas Turbine Engine Efficiency Variation with Engine Speed

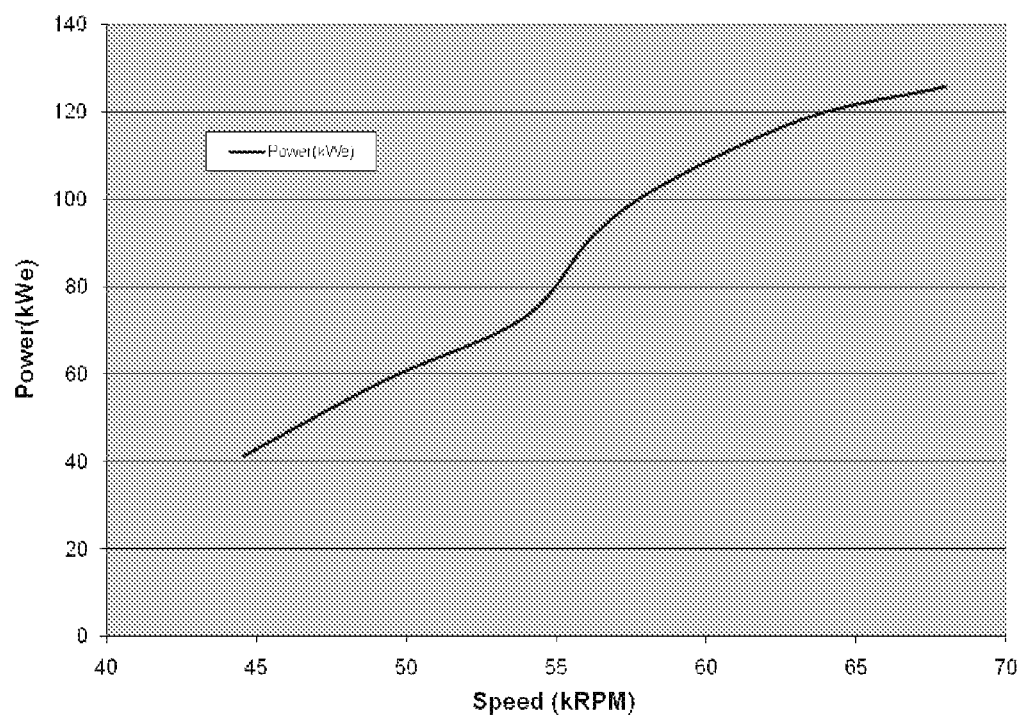
FIG. 5 – Gas Turbine Engine Power Variation with Engine Speed

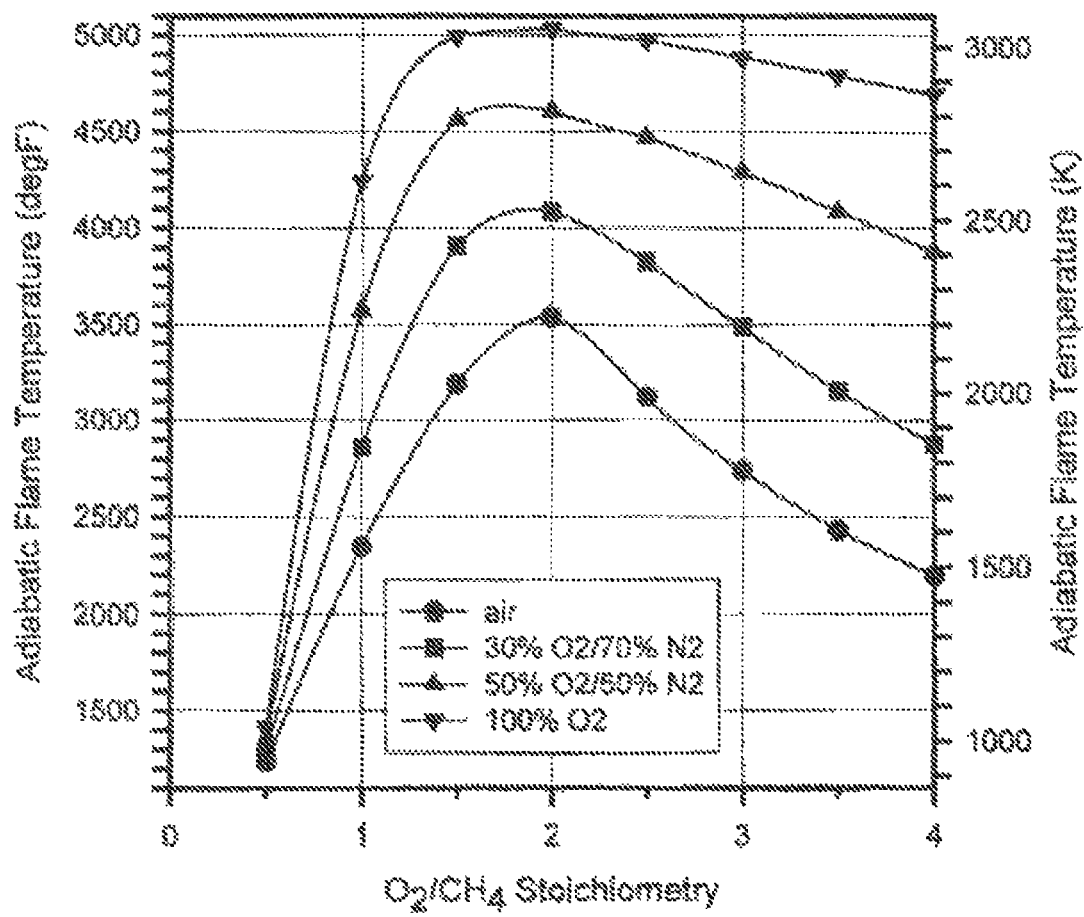
FIG. 6 – Variation of Adiabatic Flame Temperature with Equivalence Ratio

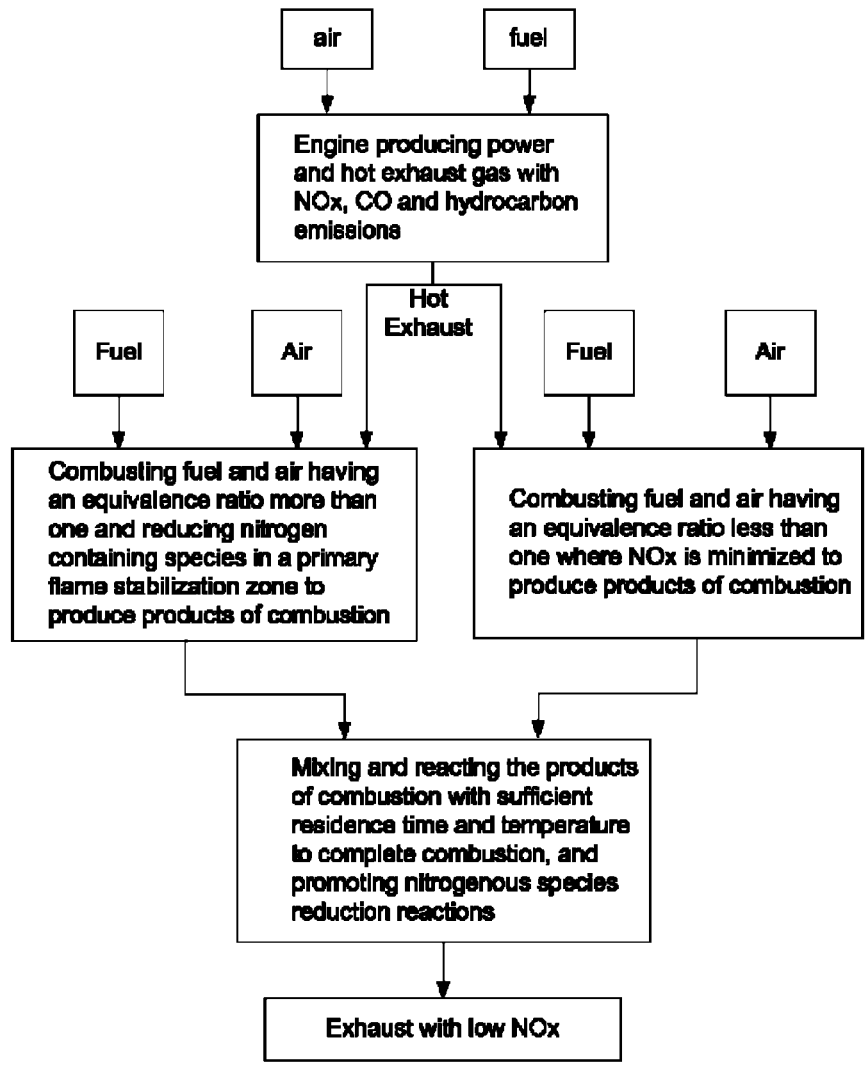
FIG. 7 – Power Burner Simple Process Illustration

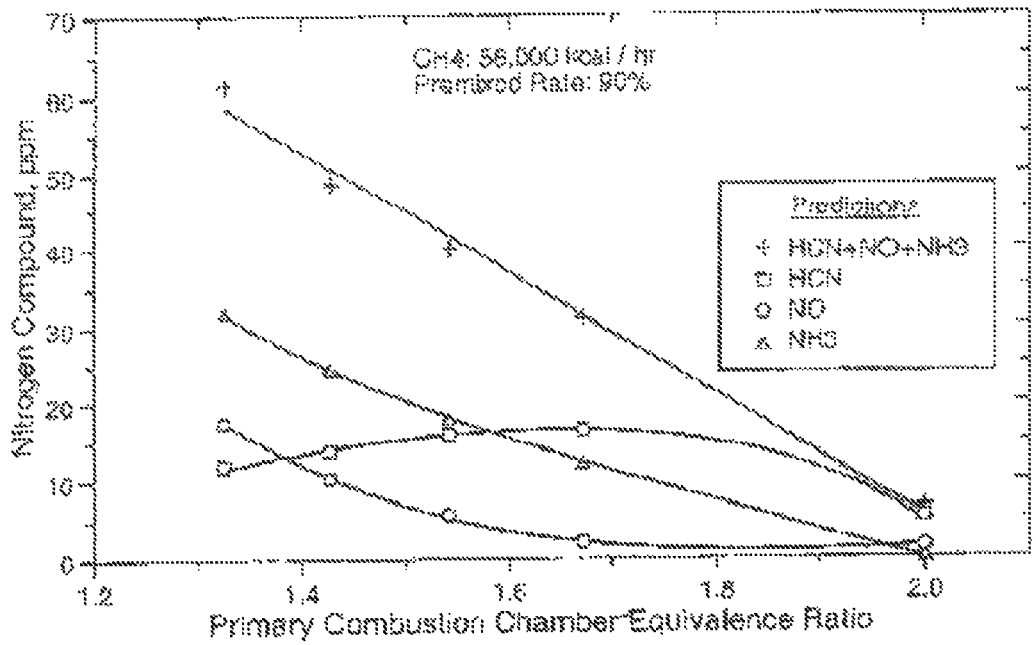
FIG. 8 – Predictions of Rich Zone Nitrogenous Species Concentrations
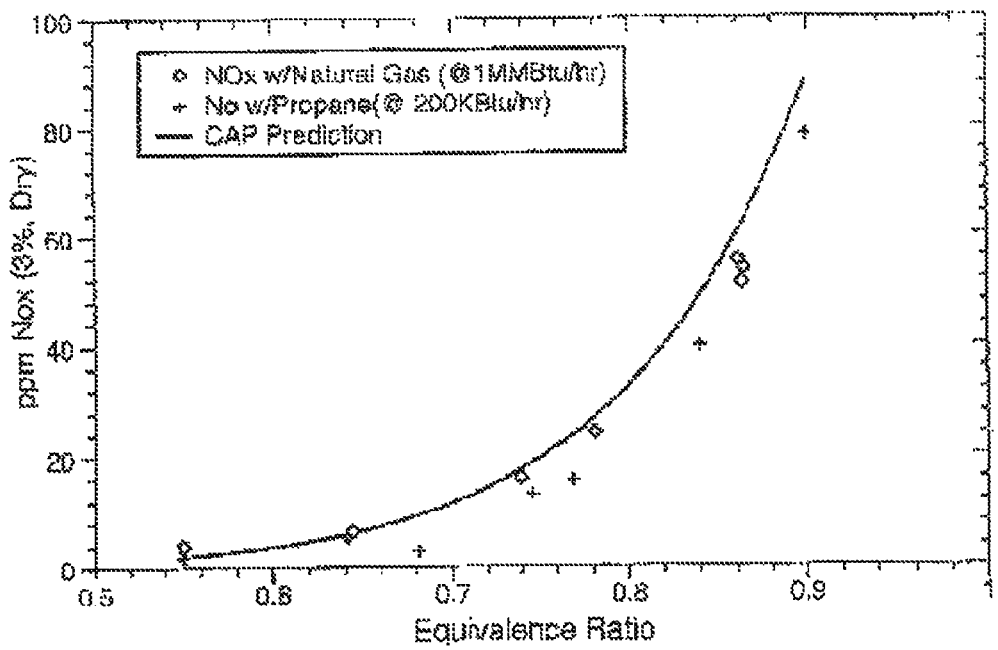
FIG. 9 – Comparison of Lean Premixed Flame Test Results and Predictions versus Equivalence Ratio

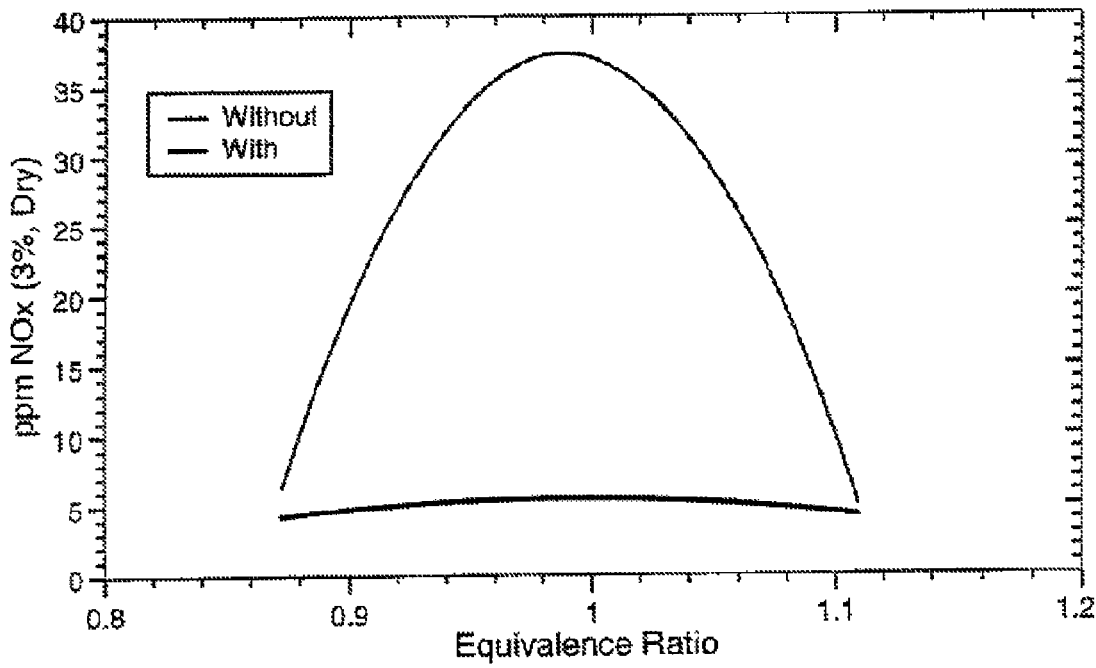
FIG. 10 – Burnout Zone NOx versus Equivalence Ratio, With and Without Temperature Reduction
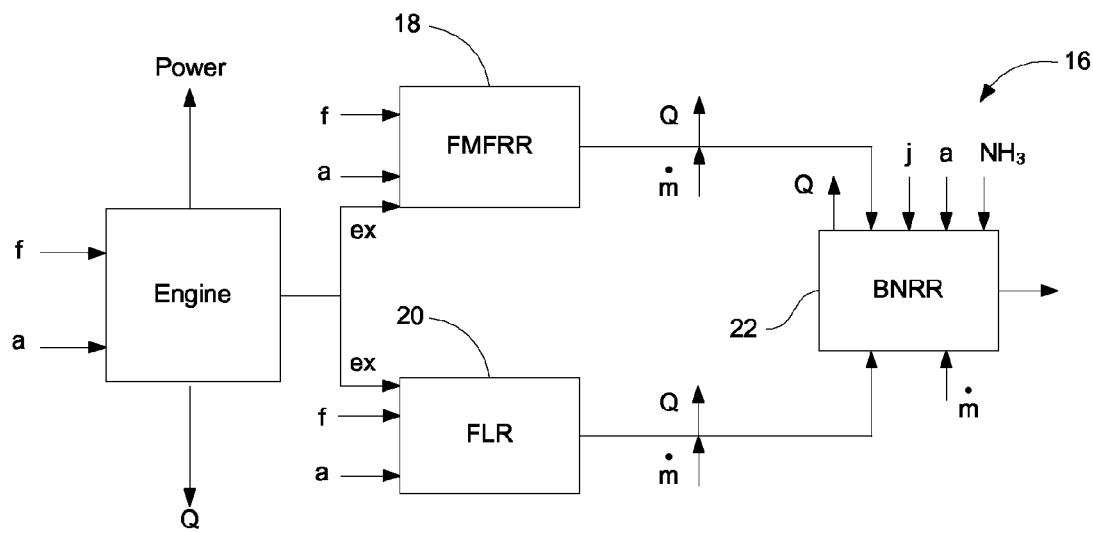
FIG. 11 – Simple Power Burner Illustration with One Reactor for Each Major Process

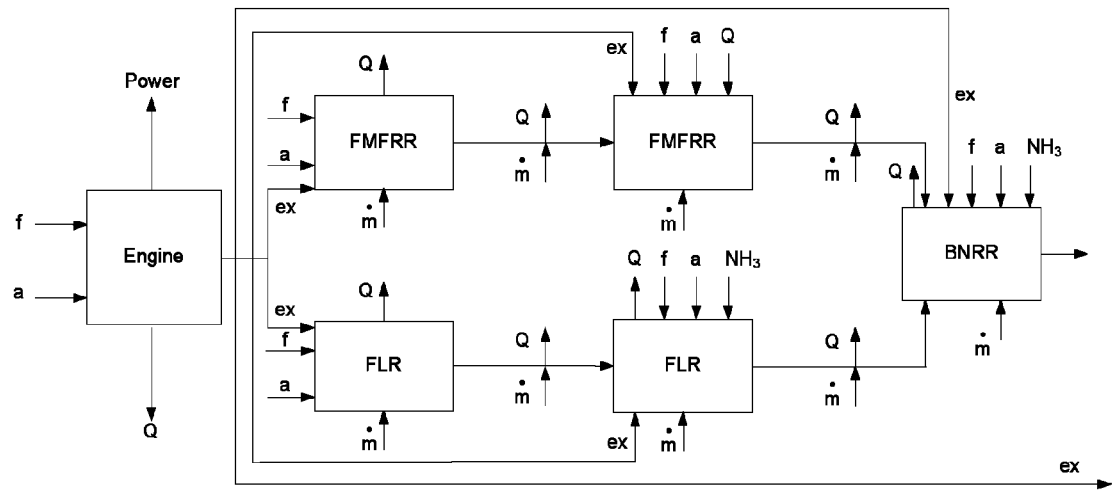
FIG. 12 – Power Burner Process with Serial FMFRR and FLR Zones
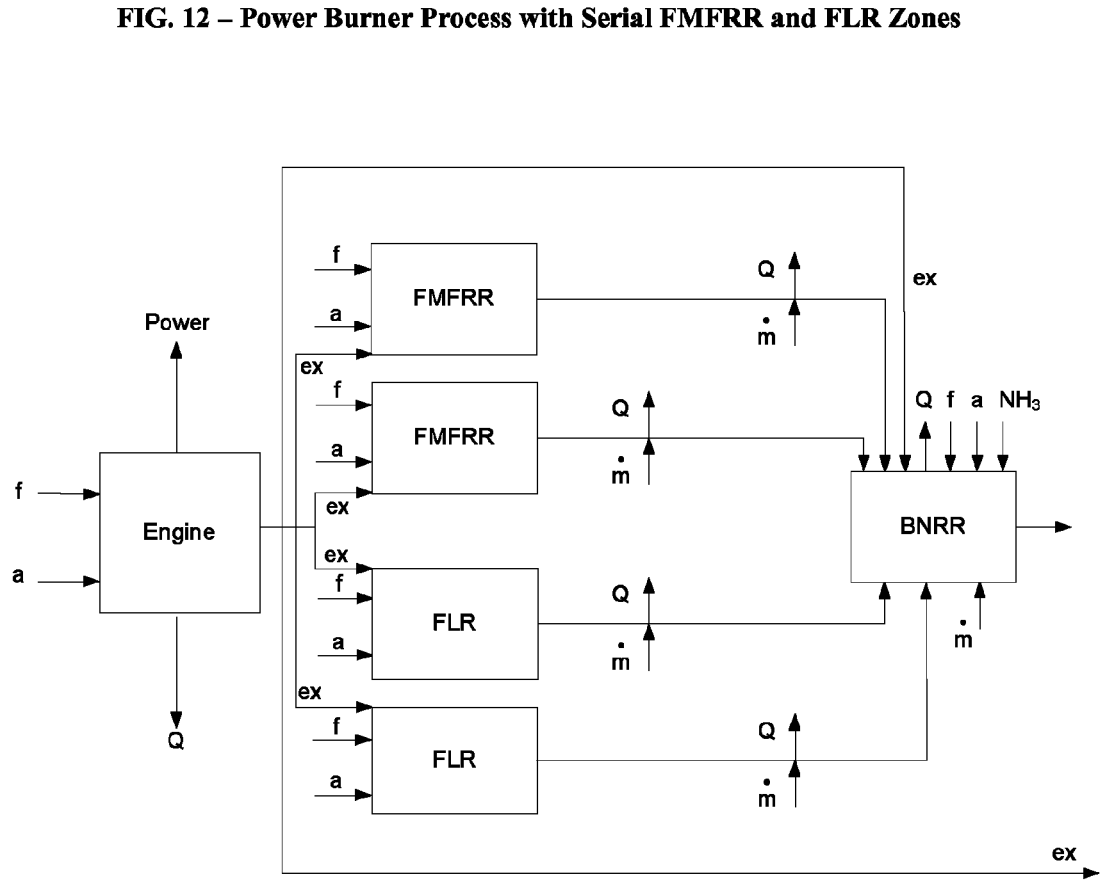
FIG. 13 – Power Burner Process with Parallel FMFRR and FLR Zones

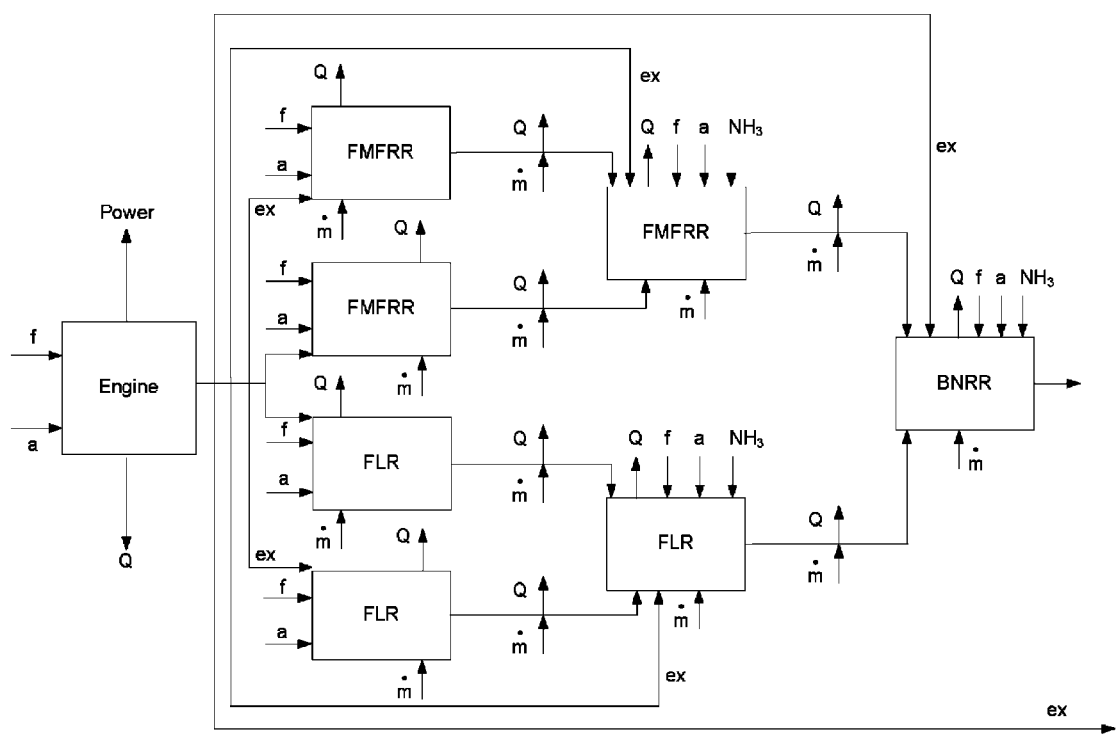
FIG. 14 – Power Burner Process with Parallel and Serial Reactors

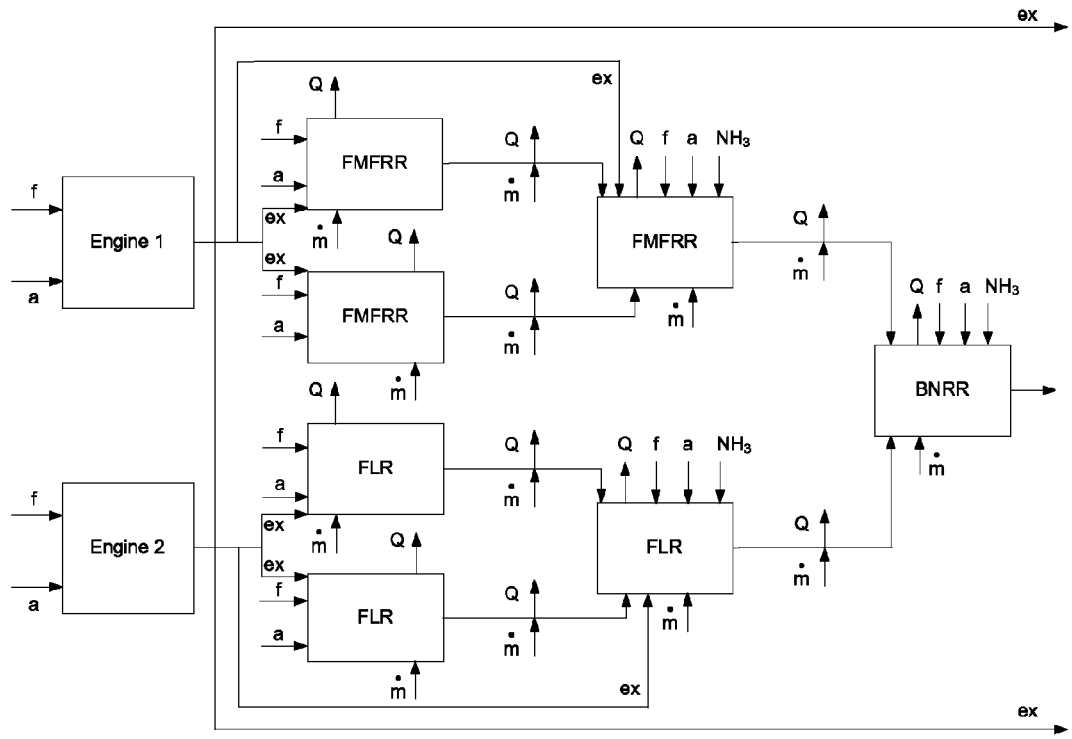
FIG. 15 – Power Burner Process with Multiple FMFRR and FLR Zones and Multiple Engines
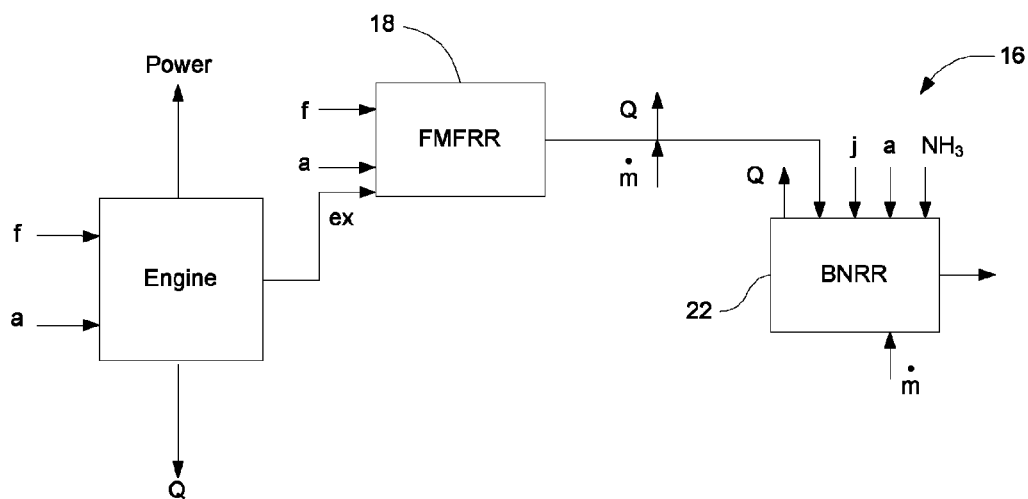
FIG. 16 – Power Burner Process with Single FMFRR and BNRR Zones

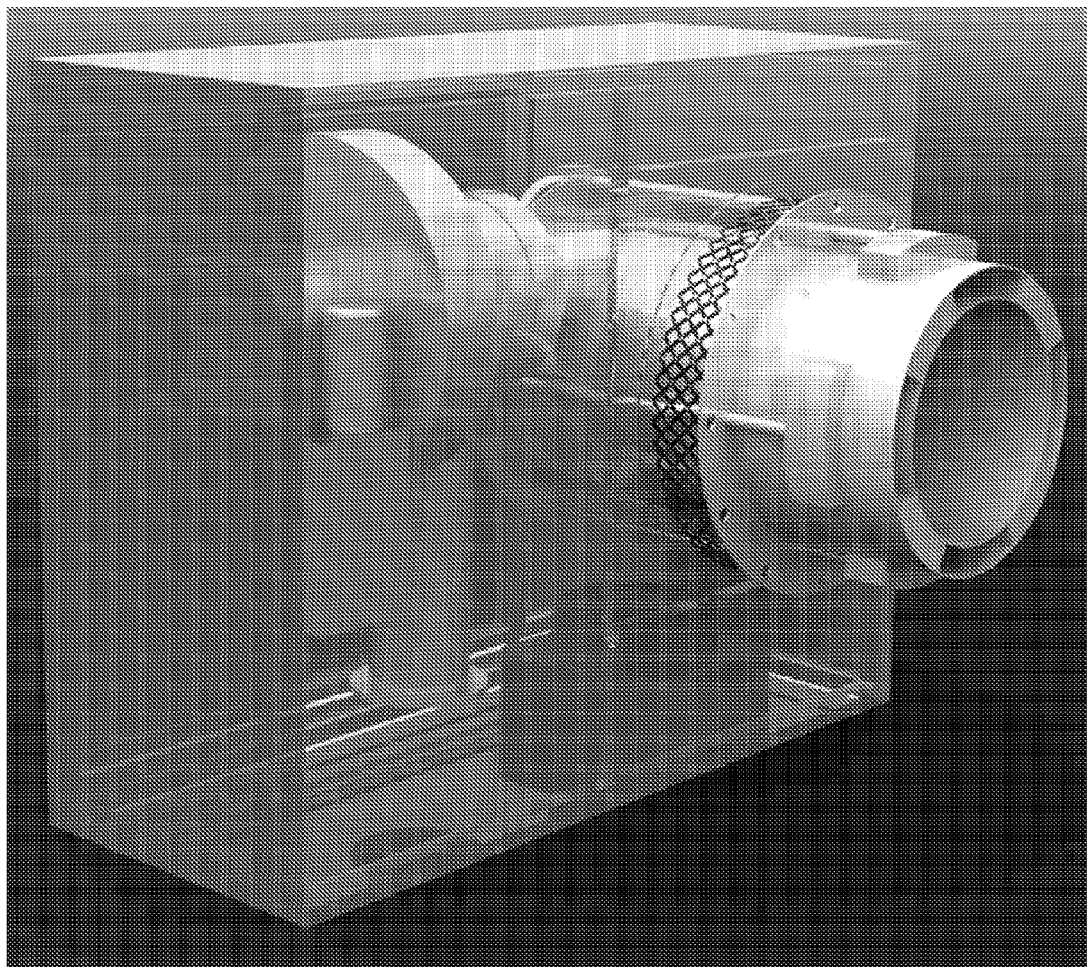
FIG. 17 – Power Burner with Engine, FMFRR, Multiple FLR and BNRR Zones

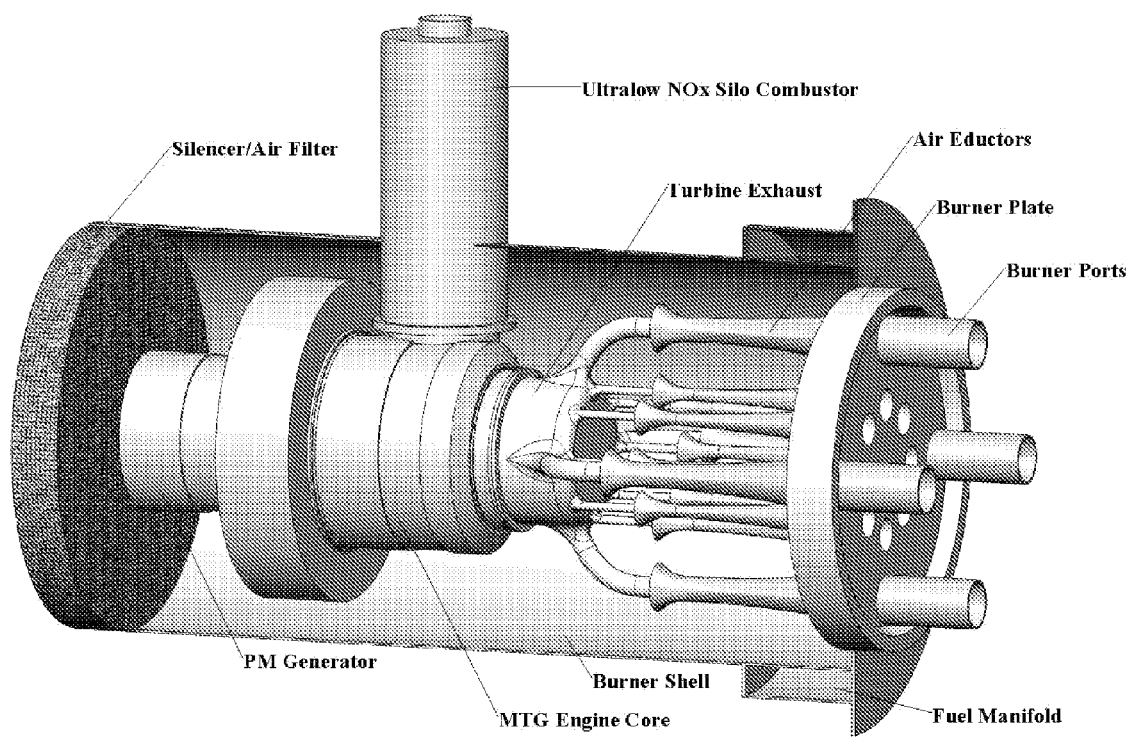
FIG. 18 – Power Burner with Engine, Eductor, FMFRR, Multiple FLR and BNRR Zones

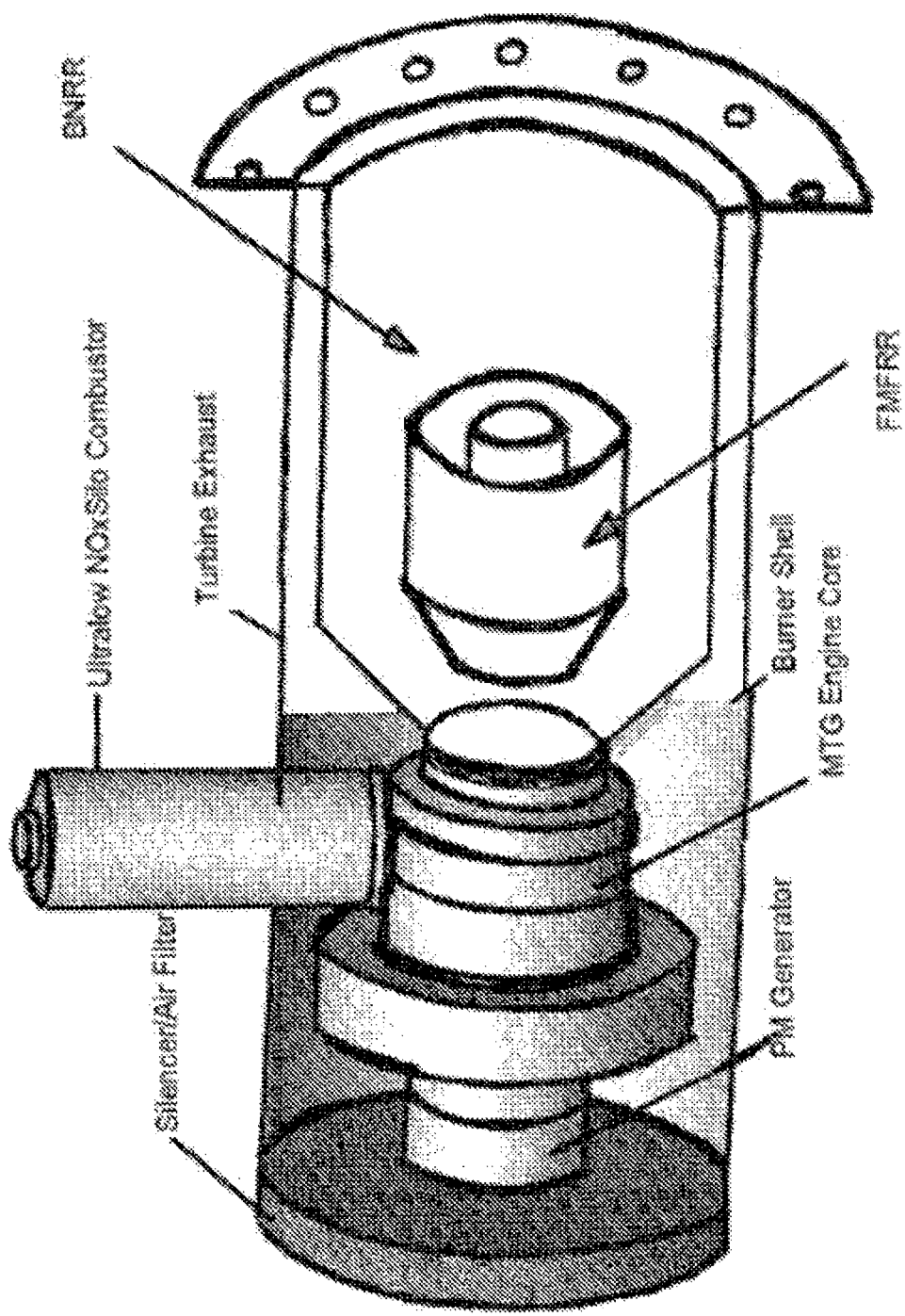
FIG. 19 - Power Burner Illustration with Engine, FMFRR and BNRR Only Zones

INTEGRATED ENGINE EXHAUST AND HEAT PROCESS FLEXIBLE AND LOW EMISSIONS COMBINED HEAT AND POWER PROCESS AND SYSTEM

CROSS-REFERENCE

This application is a continuation of U.S. application Ser. No. 13/157,625 filed Jun. 10, 2011, which claims priority to U.S. Provisional Application No. 61/354,167 filed Jun. 11, 2010.

BACKGROUND OF THE INVENTION

The effective integration of electric power producing engines and heat-based process systems that recover waste heat from engine exhausts is limited by the incompatibility of the engine's requirements of nearly constant flow, for maximum power and/or efficiency, and the process needs to modulate inlet flow from the engine exhaust to allow variation of process related fuel flow and thereby heat input required for the process. This ability to reliably modulate process fuel is particularly important when combustion emissions controls are required to meet local regulated limits.

The efficiency of an electric power generation engine is typically limited because of the fundamental thermodynamic cycle that requires some heat to be rejected to a sink during the process. Even the ideal Carnot Cycle has limited efficiency, which depends on the maximum temperature achieved in the cycle versus the minimum, or sink temperature at which heat is rejected. The power output from the cycle is then converted into electricity through various types of generators. While the Carnot cycle requires some heat rejection, and thereby loss of useful output from the fuel, non-ideal engines have even a larger amount of rejected heat. These engines include gas turbines, microturbines, compression ignition engines, spark ignition engines, Stirling cycle, etc. to name a few. Given the waste of fuel energy through rejected heat, it is of high interest to use the engine rejected heat to drive an attached process, such as boilers, water heaters, petroleum process heaters, incinerators, etc. to name a few. By recovering typically wasted heat, the combined fuel utilization, including power and heat, increases substantially. In some cases, this Combined Heat and Power (CHP) approach increases fuel utilization efficiency from 30% to over 80%, or a fuel energy utilization increase of 167%. This has obvious benefits in terms of reductions in fuel cost, fuel use, priority pollutants (e.g. NO, $NO_2$, CO, unburned hydrocarbons) and greenhouse gas emissions (e.g. $CO_2$) relative to useful output. While this approach is very positive, in most applications these advantages are not realized because of the incompatibility of the engine exhaust, and contained waste heat, with the process that attempts to recover the heat. The reasons for this incompatibility are described below. This is then followed by a description of the invention that effectively addresses this incompatibility.

Engines include air compressors and hot gas expanders, joined by combustors (internal or external) that raise temperatures to the needed level to meet cycle power output and efficiency requirements. These compressors and expanders typically use rotating components that operate best at a single design point for either maximum power or maximum efficiency. As the rotating speed changes, the flow throughput changes, which then impacts power and efficiency. This is illustrated by the typical plot of spark ignition engine power output (BHP) and efficiencies related to the inverse of BSFC in the left side of the figure and Thermal, Volumetric, Mechanical efficiencies given in the right side of FIG. 1.

A similar plot is given for a typical compression ignition engine (e.g. diesel engine) in FIG. 2, where fuel BSFC is given, which is related to the inverse of engine efficiency. As shown, for maximum power or maximum efficiency, a specific engine speed is required, with the speed range dependent on the type of engine and scale of the engine. If this speed range is reduced, or in some cases, increased, performance is decreased, which is not desirable for economic return in power generation. Furthermore, in some power generation applications, a synchronous generator is used to produce the correct AC frequency compatible with installed electrical equipment. In these cases, the design point rotating speed for optimal performance is linked with the synchronous speed required to produce the correct AC frequency. This can be accomplished through generator design, as well as gear boxes that can change speed between the engine and generator. In all cases, a fixed design point operating speed and exhaust throughput is desired. This same approach applies to gas turbine, microturbine and other types of continuous combustion power system equipment. FIG. 3 gives the flow rate versus engine speed for a typical gas turbine engine. As shown, as speed is reduced, the throughput flow is significantly reduced. FIGS. 4 and 5 show how both efficiency and power increase with speed and corresponding throughput flow. Of course, maximum speed and throughput is limited by sonic velocity and material strength limits. Therefore, as with other engines, a high speed and fixed throughput near the limits is the preferred operating point for maximum engine power output and efficiency.

As shown, there is a specific design point where gas turbine, engine efficiency and power are attractive. Also, as with spark or compression ignition engines, some of these systems need to operate at a fixed speed and thereby exhaust flow to meet synchronous generator frequency targets for proper grid interconnect. Furthermore, with gas turbine engines that operate at high rotational speeds, there are multiplicities of vibration harmonics of the rotating components that can degrade machine integrity or even destroy the engine Continuous operation at these speeds should be avoided. Once these modes are determined by analysis and testing, engine operating speeds are set to a constant speed to avoid overlap with these undesirable vibration modes. Lastly, gas turbine maximum speed is limited by sonic velocity and material strength.

In summary, for best performance and integrity, and to meet electric power AC frequency requirements in some cases, engines should be operated at a single speed that then produces a relatively fixed exhaust gas flow rate. In a CHP application, this engine operation is often incompatible with thermal load cycling processes and associated burner requirements.

Boiler, water heater, process heater, incinerator and other applications typically need to operate over a range of heat inputs to meet variable thermal load demands from the process of interest. Heat input variations, or required turndown, for boilers, etc., can be as high as 10 to 1, with 8 to 1 highly desired. By having this turndown, the output of the boiler, etc., can be well matched to the process of interest. In typical boilers and other equipment, this turndown capability is met by simultaneously reducing the fuel input and, to the extent possible, required air flow to achieve a relatively consistent fuel-to-air ratio that will then maximize boiler efficiency, as well as burner operability. For example, if only fuel flow was reduced with the air flow fixed, the amount of excess air would greatly increase, up to a factor of nine. In this case, the gas temperature would be low and process conditions may not be met. Also, with a high flow rate of gases into the exhaust per fuel use, the stack heat loss would be high. These characteristics are undesirable. Therefore, it is desired to operate at a nearly constant fuel-to-air ratio as the process load or turndown is varied. This then requires that the air flow, or exhaust from the engine, vary by up to a factor of ten. As noted above, this is incompatible with optimal engine operation, which is to run at a fixed speed and constant exhaust flow. Furthermore, if low boiler emissions at good flame stability is desired, the fixed engine exhaust flow creates further problems. Specifically, emissions control burners need to first reduce flame temperature to reduce NOx emissions that are generated in flame zones where temperatures peak. To control temperature, an inert diluent such as Flue Gas Recirculation (FGR) can be used to suppress the flame temperature and thermal NOx production. However, if FGR is used with conventional non-premixed flames, the NOx control is limited because FGR by itself only controls thermal NOx, not prompt NOx (mainly $NO_2$) that is the dominant NOx at low NOx levels of current interest. Prompt NOx is a strong function of the fuel-to-air mixture ratio, and less sensitive to temperature than thermal NOx. To better address prompt NOx, requires moving from conventional non-premixed flame burner designs, where flame zones operate at the ideal fuel-to-air ratio (i.e. stoichiometric conditions) to those where fuel and air are premixed at conditions other than the stoichiometric ratio, to control the fuel and air mixture ratio within the flame zone. In this approach, the fuel (e.g. natural gas) and air can be premixed, with the excess air beyond that required to consume the fuel acting as a diluent for the flame zone. With this "lean" premixed combustion, the flame zone temperature is also suppressed, reducing thermal NOx. However, prompt NOx is also reduced. FIG. 6 presents a plot of the flame temperature versus the oxygen-to-fuel stoichiometry. As shown, flame temperature will be high at near oxygen stoichiometric conditions of two, with temperature and NOx decreasing as the stoichiometric ratio increases above two and the premixed flame becomes more fuel "lean".

While the flame zone temperature reduction strategy, by FGR or lean premix, suppresses NOx, it also impacts flame stability. The ability of a local flame to avoid extinction is based on the rate of heat release from fuel oxidation being in balance with the heat loss from the flame zone as a result of contact with cooler gas packets, driven by random turbulent mixing, contact with cooler physical surfaces in the boiler, radiative heat loss with cooler walls and turbulent flame stretch. When kinetically controlled, the heat release is strongly related to flame temperature, which is governed by local mixture ratio, or oxygen stoichiometry, as shown in FIG. 6.

As shown, for either fuel rich (oxygen stoichiometry <2, equivalence ratio >1 or air stoichiometry <1) or fuel lean (oxygen stoichiometry >2, equivalence ratio <1 or air stoichiometry >1) conditions, adiabatic flame temperatures are significantly reduced. In addition, FGR, or higher N2, can ballast and reduce flame temperature, which is positive for NOx emissions, as shown in FIG. 6, but negative for flame stability. With reduced flame temperature for NOx control, the margin between fuel reaction rate and heat loss based extinction is reduced. Therefore, even at the design point condition, NOx emissions control reduces flame integrity and stability. This then requires a more careful control of the fuel-to-air ratio to maintain the proper flame stability margin. Importantly, if the burner requires that the fuel flow is reduced for load reduction, while the air flow is fixed (or nearly fixed) by the engine flow, then the flame will become even leaner as load is reduced. This can be illustrated by a simple example calculation. In the calculation it is assumed that the burner oxidant is a gas turbine exhaust that has an oxygen content of 15%. This flow meets the oxidant requirement for the burner at the full load design point. To achieve the needed NOx, and CO emissions of <9 ppm and <200 ppm, the burner employs fuel rich and fuel lean flame zones that then flow into a single burnout zone. For acceptable flame stability and emissions the rich zone operates at an oxygen stoichiometric ratio of 1.25 or an equivalence ratio of 1.6 and the lean zone operates at an oxygen stoichiometry of 3.22 or an equivalence ratio of 0.62, with the burnout zone operating at an oxygen stoichiometric ratio of 2.32 or an equivalence ratio of 0.86. While the flame stability and emissions control are excellent at full load, as fuel is reduced to match process needs, with a constant exhaust flow, the rich zone becomes less rich and the lean zone becomes leaner. Since both rich and lean zone temperatures are reduced as rich and lean oxygen stoichiometric ratio or equivalence ratios become higher and lower, respectively, as indicated by FIG. 6, then reaction rate falls off and flame stability degrades to the point where flames are extinguished. With a conventional low NOx burner, this is addressed by reducing the oxidant flow as fuel flow is reduced to maintain consistent rich and lean zone equivalence ratios. With the constant engine exhaust flow, in the power burner case, a different and better strategy is required. This is the needed invention, as described below.

This brief background, supports that the constant engine exhaust flow is incompatible with processes that require variable oxidant flow for meeting process requirements and optimizing operating efficiencies as well as meeting currently required emissions regulations.

SUMMARY OF THE INVENTION

In accordance one aspect, the invention provides an integrated engine and burner system and processes in a single design assembly in which the engine and burner operation and the attached heat process is optimized while meeting air emissions regulations. This is accomplished by proper fuel, oxidant, additives and diluents management to various burner zones as burner load is reduced from the design point condition. The following description is provided by way of example only and does not limit the invention.

1 In accordance with an embodiment of the invention, an electric power production and integrated combustion and emissions control process is provided that is comprised of engine zones where fuel and oxidant are burned to generate electricity and engines partially exhaust to first reaction zones, at least one of which is a primary flame stabilization zone. Each separate zone may have a total fuel to air equivalence ratio greater than one (i.e., fuel rich) to reduce NOx initially formed in the engines and produce, via combustion and nitrogenous species decay reactions over a sufficient residence time and temperature, a mixture of partially oxidized fuel (H2, CO, some unburned hydrocarbons) and low levels of nitrogenous species and nitrogenous NOx reducing species (HCN, CN NH3, NH2, NH, etc.) and low levels of nitrogen oxides (NO, NO2, etc). This may be combined with second reaction zones, each separate zone having partial engine exhaust flow and a total fuel to air equivalence ratio less than one, to produce, via combustion over a sufficient residence time and low temperature, a mixture of combustion products (H2O, CO2, etc) and a minimum amount of nitrogen oxides (NO, NO2, etc). The first and second zones may feed into third zones, each separate zone having partial engine exhaust flow and a total fuel to air equivalence ratio less than one and compatible with the flue gas excess air level requirements of the system, where the products from the first and second said reaction zones may mix and react over a sufficient residence time and temperature to complete combustion of any remaining fuel components (CO, H2 and unburned hydrocarbons) and promote a reaction between nitrogenous reducing species and nitrogen oxides to result in a minimum amount of nitrogen oxides (NO2 and NO, etc) exiting to the flue.

In some embodiments, the first zones may have separate air and fuel introduction, heat extraction, cooled furnace gas introduction and partial engine exhaust gas introduction.

The second zones may have separate air and fuel introduction, heat extraction, cooled furnace gas introduction and partial engine exhaust gas introduction The third zones may have separate air and fuel introduction, heat extraction, cooled furnace gas introduction and partial engine exhaust gas introduction In some implementations, all zones may have means for controlling engine exhaust flow, air, fuel, cooled flue gas and cooling for continuous and stepwise control at all heat outputs and controlling equivalence ratios, including turning off the fuel and/or air to zones, for optimization of flame stability and reduced emissions for constant and non-constant engine exhaust flows at all system heat outputs.

2 An electric power production and a combustion and emissions control process may be provided as in 1, where the said first zones are aligned serially, one feeding into the next, and said second zones are aligned serially, one feeding into the next, with first and second zones feeding into said third zone.

3 An electric power production and a combustion and emissions control process may be provided as in 1, where the said first zones are aligned in parallel, and said second zones are aligned in parallel, with first and second zones feeding into said third zone.

4 An electric power production and a combustion and emissions control process may be provided as in 1, where the said first zones are aligned in parallel, and said second zones are aligned in parallel, with first and second zones feeding into a plurality of said third zones.

5 An electric power production and a combustion and emissions control process may be provided as in 1, where the said first zones are aligned in parallel, and feed into additional said first zones and second zones are aligned in parallel, and feed into additional second zones, with additional first and second zones feeding into said third zone.

6 An electric power production and a combustion and emissions control process may be provided as in 1, where the said first zones are aligned in parallel, and feed into additional said first zones and second zones are aligned in parallel, and feed into additional second zones, with additional first and second zones feeding into said third zones. Any combination described herein may be provided.

7 An electric power production and a combustion and emissions control process may be provided as in 1, where the partial engine exhausts, air and fuel in the said first zones are premixed before reaction, and partial engine exhausts, air and fuel in the said second zones are premixed before reaction, and partial engine exhausts, air and fuel in said third zone are premixed before reaction. In some embodiments, some reactors are premixed and some are not premixed.

8 An electric power production and a combustion and emissions control process may be provided as in any of the preceding, where the partial engine exhausts, air and fuel in the said first zones are premixed before reaction, and the overall equivalence ratio of at least one said first zone is between 1.3 and 2.0 and the residence time is approximately 0.1 seconds and the equivalence ratio in at least one of the said second zones is between 0.8 and 0.5 and the equivalence ratio of at least one third zone is less than one.

9 An electric power production and a combustion and emissions control process may be provided as in 1, where heat is extracted from said first zones to achieve a said third zone temperature of between 1400 F and 2000 F.

10 An electric power production and a combustion and emissions control process as in 1, where heat is extracted from said second zones to achieve a said third zone temperature of between 1400 F and 2000 F.

11 An electric power production and a combustion and emissions control process may be provided as in 1, where heat is extracted from said third zones to achieve a said third zone temperature of between 1400 F and 2000 F.

12 An electric power production and a combustion and emissions control process may be provided as in 1, where partial engine exhausts and cooled flue gas is added to said first zones to achieve a said third zone temperature of between 1400 F and 2000 F.

13 An electric power production and a combustion and emissions control process may be provided as in 1, where partial engine exhausts and cooled flue gas is added to said second zones to achieve a said third zone temperature of between 1400 F and 2000 F.

14 An electric power production and a combustion and emissions control process may be provided as in 1, where partial engine exhausts and cooled flue gas is added to said third zones to achieve a said third zone temperature of between 1400 F and 2000 F.

15 An electric power production and a combustion and emissions control process may be provided as in 1, where heat is extracted from said first, second and third zones to achieve a said third zone temperature of between 1400 F and 2000 F.

16 An electric power production and a combustion and emissions control process may be provided as in 1, partial engine exhausts and cooled flue gas is added to said first, second and third zones to achieve a said third zone temperature of between 1400 F and 2000 F.

17 An electric power production and a combustion and emissions control process may be provided as in 1, where heat is extracted and partial engine exhausts and cooled flue gas added to said first, second and third zones to achieve a said third zone temperature of between 1400 F and 2000 F.

18 An electric power production and a combustion and emissions control process may be provided as in 1, where fuel to air equivalence ratios in said first and second zones are set to maximize the NOx reduction reactions in the said third zones and heat is extracted and partial engine exhausts and cooled flue gas is added to said first, second and third zones to achieve a said third zone temperature of between 1400 F and 2000 F. Any description herein of maximizing or minimizing a characteristic may also refer to improving the characteristic or approaching a desired goal. For example, any description of attaining a maximum value may also be applied to increasing the value, and any description of attaining a minimum value may also be applied to decreasing the value.

19 An electric power production and a combustion and emissions control process may be provided as in 1, where fuel to air equivalence ratios in said first and second zones are set to maximize the NOx reduction reactions in the said third zones and heat is extracted and partial engine exhausts and cooled flue gas is added to said first, second and third zones to achieve a said third zone temperature of between 1400 F and 2000 F and a NOx reduction agent is added to the said third reaction zone.

20 An electric power production and a combustion and emissions control process may be provided as in 1, where fuel to air equivalence ratios in said first and second zones are set to maximize the NOx reduction reactions in the said third zones and heat is extracted and partial engine exhausts and cooled flue gas is added to said first, second and third zones to achieve a said third zone temperature of between 1400 F and 2000 F and a NOx reduction agent, from the family comprising ammonia, urea, isocyanuric acid, etc., is added to the said third reaction zone.

21 An electric power production and a combustion and emissions control process may be provided as in 1, where fuel to air equivalence ratios in said first and second zones are set to maximize the NOx reduction reactions in the said third zones and heat is extracted and partial engine exhausts and cooled flue gas is added to said first, second and third zones to achieve a said third zone temperature of between 1400 F and 2000 F and a NOx reduction agent, from the family comprising ammonia, urea, isocyanuric acid, etc., is added to the said third reaction zones in a concentration in balance with NOx, less the amine type species concentrations available in the third said zones.

22 An electric power production and a combustion and emissions control process may be provided as in 1, where fuel to air equivalence ratios in said first and second zones are set to maximize the NOx reduction reactions in the said third zones and heat is extracted and partial engine exhausts and cooled flue gas is added to said first, second and third zones to achieve a said third zone temperature of between 1400 F and 2000 F and a NOx reduction agent is added to the said first, second, or third reaction zones.

23 An electric power production and a combustion and emissions control process may be provided as in 1, where fuel to air equivalence ratios in said first and second zones are set to maximize the NOx reduction reactions in the said third zones and heat is extracted and partial engine exhausts and cooled flue gas are added to said first, second and third zones to achieve a said third zone temperature of between 1400 F and 2000 F and a NOx reduction agent, from the family comprising ammonia, urea, isocyanuric acid, etc., is added to the said first, second or third reaction zones.

24 An electric power production and a combustion and emissions control process may be provided as in 1, where fuel to air equivalence ratios in said first and second zones are set to maximize the NOx reduction reactions in the said third zones and heat is extracted and partial engine exhausts and cooled flue gas are added to said first, second and third zones to achieve a said third zone temperature of between 1400 F and 2000 F and a NOx reduction agent, from the family comprising ammonia, urea, isocyanuric acid, etc., is added to the said first, second or third reaction zones in a concentration in balance with NOx, less the amine type species concentrations available in the third said zones.

25 An electric power production and a combustion and emissions control process may be provided as in 1, where fuel to air equivalence ratios in said first and second zones are set to maximize the NOx reduction reactions in the said third zones and heat is extracted and partial engine exhausts and cooled flue gas are added to said first, second and third zones to achieve a said third zone temperature of between 1400 F and 2000 F, where said first, second and third zones are separated by solid partitions, except where one feeds the other.

26 An electric power production and a combustion and emissions control process may be provided as in 1, where fuel to air equivalence ratios in said first and second zones are set to maximize the NOx reduction reactions in the said third zones and heat is extracted and partial engine exhausts and cooled flue gas are added to said first, second and third zones to achieve a said third zone temperature of between 1400 F and 2000 F, where the said first zone is separated from the said second and said third zones by a solid partition, except where they feed each other.

27 An electric power production and a combustion and emissions control process may be provided as in 1, where fuel to air equivalence ratios in said first and second zones are set to maximize the NOx reduction reactions in the said third zones and heat is extracted and partial engine exhausts and cooled flue gas are added to said first, second and third zones to achieve a said third zone temperature of between 1400 F and 2000 F, where the said first, second and third zones are separated by aerodynamic means.

28 An electric power production and a combustion and emissions control process may be provided as in 1, where fuel to air equivalence ratios in said first and second zones are set to maximize the NOx reduction reactions in the said third zones and heat is extracted and partial engine exhausts and cooled flue gas are added to said first, second and third zones to achieve a said third zone temperature of between 1400 F and 2000 F, where the said second zone is separated from the said first and said third zones by a solid partition, except where they feed each other.

29 An electric power production and a combustion and emissions control process may be provided as in 1, where fuel is modulated to each zone as heat load is reduced to maximize flame stability and minimize emissions, for constant and non-constant engines exhausts flows.

30 An electric power production and a combustion and emissions control process may be provided as in 1, where air is modulated to each zone as heat load is reduced to maximize flame stability and minimize emissions for constant and non-constant engines exhausts flows.

31 An electric power production and a combustion and emissions control process may be provided as in 1, where fuel and air are modulated to each zone as heat load is reduced to maximize flame stability and minimize emissions for constant and non-constant engines exhausts flows.

32 An electric power production and a combustion and emissions control process may be provided as in 1, where fuel is shut off to selected zones as heat load is reduced to maximize flame stability and minimize emissions for constant and non-constant engines exhausts flows.

33 An electric power production and a combustion and emissions control process may be provided as in 1, where air is shut off to selected zones as heat load is reduced to maximize flame stability and minimize emissions for constant and non-constant engines exhausts flows.

34 An electric power production and a combustion and emissions control process may be provided as in 1, where air and/or fuel is shut off to selected zones as heat load is reduced to maximize flame stability and minimize emissions for constant and non-constant engines exhausts flows.

35 An engine and burner system design may be provided, as illustrated in FIG. 7 by way of example only, where the said engine exhausts into the said first rich zone along the centerline of the burner that operates at the optimal equivalence ratio and is sufficiently large and insulated to achieve the needed time and temperature for optimal NOx and nitrogenous species decay, and engine exhausts into lean burners that create said multiple second lean reaction zones that surround the exit of the rich zone and operate at the optimal equivalence ratio and entrain sufficient furnace gas and transfer sufficient heat to the furnace walls to create the optimal temperature and species concentrations needed for optimal NOx control in the downstream said third burnout and NOx reduction zone 36 An engine and burner system design may be provided, as illustrated in FIG. 7 by way of example only, where the engine exhausts into the rich zone along the centerline of the burner and engine exhausts into lean burners that create lean reaction zones that surround the exit of the rich zone, with four lean zones with rich zone and lean zone fuel modulated as the burner load is reduced to maximize flame stability of rich and lean zones.

An engine and burner system design, as illustrated in FIG. 7 by way of example only, where the rich zone is along the centerline of the burner and lean burners that create lean reaction zones surround the exit of the rich zone, with four lean zones with selected lean zone fuel shut off and fuel redistributed to other operating zones to maximize flame stability and minimize emissions in all operating burner zones. Any combination of any description provided herein may be provided.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1 shows typical performance characteristics versus engine speed/throughput for a spark ignition engine.

FIG. 2 shows typical compression ignition engine performance characteristics with engine speed.

FIG. 3 shows typical gas turbine engine flow variation with engine speed.

FIG. 4 shows typical gas turbine engine efficiency variation with engine speed.

FIG. 5 shows typical gas turbine engine power variation with engine speed.

FIG. 6 shows a variation of adiabatic flame temperature with oxygen to fuel stoichiometry for different oxygen to nitrogen ratios.

FIG. 7 shows a simple process illustration for a power burner.

FIG. 8 shows predictions of rich zone nitrogenous species concentrations.

FIG. 9 shows a comparison of lean premixed flame test results and predictions versus equivalence ratio.

FIG. 10 shows a burnout zone NOx versus equivalence ratio, with and without temperature reduction.

FIG. 11 shows a simple illustration of a power burner with one reactor for each major process.

FIG. 12 shows a power burner process with serial fuel rich (FMFRR) and fuel lean (FLR) zones.

FIG. 13 shows a power burner process with parallel FMFRR and FLR zones.

FIG. 14 shows a power burner process with parallel and serial reactors.

FIG. 15 shows a power burner process with multiple FMFRR and FLR zones and multiple engines.

FIG. 16 shows a power burner process with single FMFRR and burnout (BNRR) zones.

FIG. 17 shows a power burner with single engine, FMFRR, and multiple FLR and BNRR zones.

FIG. 18 shows a power burner with engine, eductor, FMFRR, and multiple FLR and BNRR zones.

FIG. 19 provides a power burner illustration with engine, and FMFRR and BNRR only zones.

DETAILED DESCRIPTION OF THE INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems, methods, and devices for a combined heat and power process that may use an integrated engine exhaust and heat process, that may be flexible and provide low emissions. Various aspects of the invention described herein may be applied to any of the particular applications set forth below or for any other types of energy production or generation systems. The invention may be applied as a standalone tool or as part of an integrated system utilizing engines and power generators or burners. It shall be understood that different aspects of the invention can be appreciated individually, collectively or in combination with each other.

A power burner can be designed with many engines and burner reaction zones, or a single engine and a single reaction zone, to achieve different objectives. However, for the purpose of illustration, a single engine (Engine), one fuel rich (FMFRR or zone with equivalence ratio >1), one fuel lean (FLR or zone with equivalence ratio <1) and one burnout zone (BNRR or zone that receives some FMFRR and/or FLR exit gases) are given in FIG. 7 for illustration purposes. Processes occurring in each zone are now described.

Engine

In this zone, air or a mixture of oxygen and other gases may be compressed by engine components to a higher pressure than that of the engine inlet. Fuel may then be added to the compressed air and ignited to raise the temperature of the air, which is then expanded to create power. In this process, some of the oxygen in the air or mixture may be consumed. The fuel can be natural gas, refinery gas, propane, oil etc. As shown in FIG. 7, some heat may be lost to the ambient as a result of heat transfer from the hot engine components. As an alternative to internal heat release, the combustion within the engine for hot gas generation and expansion can be replaced with an externally fired, or heated by other means, heat exchanger. In this approach the compressed air could be heated to the needed temperature through the heat exchanger. For this case, besides hot exhaust from the engine, the waste heat from the exit of the heat exchanger may also be available for recovery in the burner and downstream process. If air is used in the engine, the oxygen content of the indirectly fired engine exhaust may be 21%, with the heat exchanger exhaust oxygen content being somewhere between no oxygen and 21% if air is used in the combustor. Both of these streams could be transported into the downstream rich or lean reactor zones, as illustrated in FIG. 7. Lastly, in closed cycles that are externally fired (e.g. Stirling), the combustor exhaust could be the only hot gas stream that is transported to the rich and lean reactors. For a typical internal combustion case, only a single exhaust stream from the engine is produced, and the oxygen level can vary from zero to 21%, if pure air is used in the engine. In alternate cases or embodiments, additional exhaust streams from the engine may be produced, and the oxygen level may vary within any numerical range (e.g., 0-15%, 0-20%, 0-21%, 0-25%, 0-30%, 0-35%).

Fuel Modification Fuel Rich Reactor (FMFRR)

In this zone, some fraction of the engine exhaust and fuel and air may be injected at overall fuel rich conditions. The fuel can be natural gas, refinery gas, propane, oil etc. In the environment with limited oxygen, the complex fuel molecules are partially oxidized to mainly CO and $H_2$. Because, oxygen is limited, reactor temperatures can be high and thermal NOx production will still be limited. This helps to facilitate flame stability as well as produce low NOx. In addition, the energy extracted from the engine exhaust as power may reduce the peak flame temperature, acting like Flue Gas Recirculation (FGR) or similar diluents (e.g. steam). The high temperature and radiation from this zone may provide a strong radiation signal, which may make flame safeguard operation more positive, relative to other low NOx flames. Also, initial uniform mixing and reaction followed by plug flow in this zone may destroy complex hydrocarbons that can escape other types of flames and become pollutants. In particular, the pollutants in the engine exhaust (e.g. NO, NO2, CO, unburned hydrocarbon emissions) can be processed and destroyed in the rich flame zone. This is an advantageous feature of the systems and methods described herein. With the FMFRR, mainly CO and $H_2$ may exit the zone and may be transported into the BNRR burnout zone.

In the low oxygen atmosphere of the FMFRR, NOx production may be substantially suppressed. However, prompt NOx processes may also produce nitrogenous species, such as HCN and NH3. This is illustrated in the FMFRR predictions given in FIG. 8. As shown, at an equivalence ratio of 1.3, HCN and NO are above 10 ppm, and $NH_3$ is above 30 ppm, giving a total nitrogenous species concentration of 60 ppm. If air were simply added to this mix downstream, without any reduction in temperature, the $NH_3$ and HCN would mainly convert to NO, and the existing NO would not be reduced. This could result in high NOx emissions relative to the goal. However, increasing the equivalence ratio and allowing the reduction reactions to proceed under plug flow for an adequate residence time may reduce NO, $NH_3$ and HCN substantially. In this case, the total nitrogenous species may be under 10 ppm. In alternate implementations, the total nitrogenous species may be under 12 ppm, 8 ppm, 6 ppm, or 5 ppm. In this case, oxidation of these species in a downstream zone could result in a much lower total NOx. However, a preferable approach to minimize downstream NOx production may be to tailor the nitrogenous species production in the FMFRR to complement and reduce the NOx produced in the FLR lean flame zone. Also, in addition to producing the correct nitrogenous species mix, the CO and soot produced in the FMFRR can be tailored to assist NOx reduction in the downstream zone. Specifics of these reduction processes are discussed below.

The above predictions and comments address the case where fuel bound nitrogen may be small or zero. This covers many fuels of interest. For cases where there is considerable fuel nitrogen, reaction in the FMFRR may reduce the nitrogen to mainly molecular nitrogen, as noted above. However, the remaining NO, HCN and $NH_3$ may exceed that shown in FIG. 8. Therefore, conditions may have to be adjusted in the FMFRR and downstream zones to minimize overall NOx for this case. The same basic principals could be followed to optimally control NOx at good combustion conditions. However, even at optimal or improved conditions, the total NOx for the fuel bound nitrogen case may exceed that for the non fuel bound nitrogen case.

The gases that exit the FMFRR zone may mix with oxygen containing FLR product gases and release heat in the BNRR. This stretches out heat release, that may then have a reduced potential for acoustics coupling. This may be very beneficial to avoiding noise and vibrations. While the flame may be stretched out relative to a low NOx lean premixed burner, the Power Burner rich flame may be shorter than a conventional flame, as a result of good individual zone mixing and a downstream mixing design that can more rapidly mix gases than a conventional single jet flame. Therefore, low noise potential may be achieved, in a compact overall flame length. The extended flame may have high temperature soot that may increase the emissivity and heat transfer from the flame. This may be beneficial to heat transfer, relative to lean premixed low NOx burners. With a Power Burner as provided in accordance with an embodiment of the invention, flame heat transfer may be more conventional than with other low NOx burners.

As noted above, the FMFRR may operate at a higher temperature than typical low NOx burner flames. As load is reduced, the extra temperature is beneficial in maintaining stability at the lower loads. Also, with the higher temperature, the decay of nitrogenous species and NOx may be enhanced. In contrast, other low NOx burners need significant adjustments in flue gas to maintain stability at low loads. Also, because many of these burners are premixed at lean nearly stoichiometric conditions, flashback becomes a limitation. With the Power Burner, fuel rich mixed conditions may limit flashback, and wider turndown of the FMFRR should be expected. For this particular concept configuration, the constant exhaust flow from the engine can be offset by some reductions in added air to maintain good flame stability as the burner is turned down. As an alternative, the fuel to air ratio can be modified as the burner is turned down to help maintain stability. This illustrates the flexibility of the burner. Another load following approach for a Power Burner with multiple FMFRRs could be to stepwise shut down fuel flow to individual FMFRRs as load is reduced and divert this fuel to operational FMFRRs. This would allow remaining FMFRRs to operate under more favorable equivalence ratio conditions. This strategy is valuable in maintaining flame stability in cases where engine exhaust flow is constant, as will be described below.

In summary, the FMFRR may stabilize the burner, produce a highly detectable flame, and create an extended luminous flame that has good heat transfer and acoustic properties. Also, the maintenance of high temperature and plug flow conditions in the end part of the FMFRR may decay both NOx and nitrogenous species levels, including those entering with the engine exhaust gases, to those needed for optimal or improved reaction downstream. Importantly, the processes in the FMFRR may also reduce engine generated CO and unburned hydrocarbon emissions as well as control NOx and generate nitrogenous species, CO and soot, that will assist NOx reduction in downstream regions. Lastly, the hot gases from the FMFRR may promote ignition and stabilization of downstream reaction zones. This may be beneficial to FLR and BNRR zones, which could have reaction quenching, if the FMFRR hot gases were not present.

Fuel Lean Reactor (FLR) Flame Zone

FIG. 7 shows an illustration of a power burner simple process. Hot exhaust from the engine, fuel and air may be mixed in the FLR ahead of combustion. Therefore, the engine exhaust may be processed by the lean flame. The lean premixed flames in the FLR may be generated in parallel with the FMFRR reaction. Lean premixed flames may minimize NOx by controlling temperature with excess air, to suppress thermal NOx, and operating overall fuel lean to control prompt NOx. In addition, the power removed from the engine may reduce the peak temperature of the flame and act like FGR, as noted in the FMFRR discussion. FIG. 9 shows NOx predictions and data for lean premixed flames as a function of equivalence ratio. As shown, NOx may be reduced as equivalence ratio is reduced. This result is complementary to the FMFRR behavior, where increasing the equivalence ratio reduces NOx. Therefore, bringing together FMFRR and lean flame gases from the FLR can result in low NOx and complete burnout of the fuel. As shown in FIG. 9, NOx can be driven to very low levels with lean flames. This supports that it may be preferable for more of the fuel to be burned in the lean flames. However, the correct ratio of FMFRR to FLR fuel may be governed by the burnout flame processes, where the FMFRR and lean gas products may mix and combustion can be completed. This may be addressed below.

A major deficiency of typical low NOx lean premixed flames is their reduced stability and acoustics coupling. However, in the Power Burner, the hot gases from the FMFRR can be used to continuously heat and ignite the lean fuel and air mixture. Therefore, lean flame stability with the Power Burner is good. Also, because the rich gases stretch out the flame, the poor acoustic characteristics of lean flames may be mitigated by the FMFRR stretched out flame and burnout processes. Therefore, the benefits of lean flames can be achieved in the Power Burner without the negative aspects common in low NOx lean premixed burners.

The lean premixed flames may achieve low NOx without flue gas recirculation, because the extra air can dilute the flame gases and controls temperature and NOx. However, as the lean products mix with the FMFRR gases, the gases may reach near overall stoichiometric conditions. If heat has not been extracted from the gases, or diluents not mixed with the gases, including the engine exhaust flow, then temperatures can rise to high levels, where NOx can be produced. Therefore, prior to the burnout zone, heat is preferably extracted from the gases or the gases diluted. With the lean flame gases, heat extraction can be facilitated. The lean burned gases may have significant oxygen content and may be at a modest temperature, compared to normal flames. Also, the gases may not contain any CO or unburned hydrocarbons. Therefore, these gases can be directed at a cooled surface, to lose heat, prior to mixing with the FMFRR gases. Because of the gas conditions, this can be accomplished without concern for degrading the surface, as in the case with a conventional flame. Also, lean flame jets can be configured to entrain furnace gas prior to mixing with the FMFRR gases. This may also reduce burnout temperature and help suppress NOx.

As load is reduced, lean flame stability may be reduced for typical low NOx burners. However, in the Power Burner case, the rich reactor may continue to ignite the lean gases. Also, the stoichiometry of the lean flames could be adjusted to enhance stability. The burnout zone could then have to take up more of the burden for NOx control. However, at low loads, NOx may be lower, giving more flexibility for adjusting conditions. Another load following approach for a Power Burner with multiple FLRs could be to stepwise shut down fuel flow to individual FLRs as load is reduced and divert this fuel to operational FLRs. This would allow remaining FLRs to operate under more favorable equivalence ratio conditions. This strategy is valuable in maintaining flame stability in cases where engine exhaust flow is constant, as will be described below.

In summary, the FLR lean flame zone may burn the majority of the fuel with mixed engine exhaust flow at very low NOx and produce a gas that is favorable for heat extraction by convective cooling. While the stability and acoustic characteristics of this type of flame would be problematic in a typical low NOx burner, the presence of the FMFRR product gases may help to continuously ignite and stabilize the lean flames and add good burnout zone acoustic characteristics to the overall combustion. Lastly, although the lean flames may produce low NOx, a combination of FMFRR and lean flame gases in the burnout zone can produce the lowest NOx. Lastly, injecting an amine type reductant in the burnout zone could further lower NOx. This is discussed below.

Burnout and NOx Reduction Reactor (BNRR) Zone

As shown in FIG. 7, the FLR lean flame products and FMFRR product gases may be brought together in the BNRR burnout flame zone, where all or most fuel components may be completely oxidized. Besides fuel component burnout, this zone may be optimized or improved to further reduce and/or minimize NOx. As noted in FIG. 7, heat may be extracted, or gases may be diluted with cooled flue gas, steam, etc., to control the final temperature of the burnout zone. As shown in the predictions in FIG. 10, NOx emissions across the burnout flame may be high if temperature is not controlled. This may be denoted by the case "without" temperature control. However, if temperature is reduced, as illustrated by the heat extraction case in FIG. 10, denoted "with" temperature control, then NOx can be reduced to below 5 ppm. This may be a result of the special processes in the ULNB burnout zone.

As noted above, the FMFRR may produce gases with a mix of NO, HCN and NH3. Also, the gases may contain CO and soot, which are NOx reductants, at the proper temperature and oxygen conditions. In contrast, the lean flames can produce a high oxygen content gas with just NOx. If these two gases are brought together at the right temperature and at the right mixing rate, NOx reduction processes, like those in the post combustion control Selective Non-Catalytic Reaction (SNCR), can be activated to reduce NOx to very low levels, as illustrated by the results in FIG. 10. A combination of amine species NOx reduction, as included in the predictions, and CO and soot NOx reductions may lead to the needed NOx reduction. As noted above, if the burnout zone temperature is too high, the amine species may oxidize to NOx. Also, if the temperature is too low, then the amine species can even exit the system unreacted. Therefore, temperature control in the burnout zone may provide optimal or improved results. It should be noted that the engine exhaust could also be injected into the burnout zone to control temperatures and oxygen levels for optimal or improved performance. This is described below.

The final BNRR burnout and NOx reduction zone may permit the very low final NOx levels produced by the burner. Also, conditions where NOx can be optimally or desirably reduced can be achieved in the burnout zone, because fuel ignition and flame stability occur elsewhere and the only criteria on the burnout zone may be CO burnout. As noted above, temperatures may preferably be above 1500 F, allowing the 1700 F temperature, which may be optimal or beneficial for the amine NOx reduction reactions under oxygen rich conditions.

In the above BNRR process discussion, all of the NOx reduction agents for the burnout zone were highlighted as coming from the FMFRR. However, as noted earlier, it is possible to augment these reductants by injecting amine species or fuel and air directly into the BNRR. The addition of amine species could help supplement that coming out of the FMFRR. As noted previously, there may be an optimal ratio between amine species and NOx to achieve maximum NOx reduction. Similarly, there may be beneficial ratios between amine species and NOx to achieve improved NOx reduction. Also, the addition of hydrocarbon fuel can broaden the temperature range over which the NOx reduction process is maximized. Therefore, besides the direct reduction of NOx by reaction with hydrocarbons, injections of fuel may help optimize or improve the amine species NOx reduction process. The downstream air injection in the BNRR may be simply used to oxidize any remaining fuel components, as required. It should be noted that these additional injected reactants may be of most interest for fuel cases that have fuel bound nitrogen, or that tend to produce higher flame temperatures and NOx, then natural gas. For the clean natural gas case, these additional reactants may not be required. Another load following approach for a Power Burner with multiple BNRRs could be to stepwise shut down fuel flow to individual BNRRs as load is reduced and divert this fuel to operational BNRRs. This would allow remaining BNRRs to operate under more favorable equivalence ratio conditions. This strategy is valuable in maintaining flame stability in cases where engine exhaust flow is constant, as will be described below.

In summary, the BNRR burnout and NOx reduction zone conditions can be set to bring together the FMFRR and lean flame gases for optimal or improved NOx reduction, without concern for impacts on stability, acoustics and turndown, which are controlled by the FMFRR zone. Also, the majority of the fuel can be burned under low NOx conditions in the FLR, because of the stabilizing influence of the FMFRR. As described, the Power Burner design may create several reaction zones that each have unique characteristics that act cooperatively to optimize or improve NOx, burnout, stability, noise, turndown, heat transfer and flame detection. While the above Power Burner discussion used a simple four zone illustration, it is clear that several additional zones could be incorporated using the same principals as above to achieve optimal or improved performance for a wide range of applications. For example, five, six, seven, eight, or more zones may be used. In addition, if the amount of fuel added in the FMFRR zone is limited and the resulting mixture of engine exhaust and FMFRR fuel and air are overall fuel lean, then no FLR zones are required. In this case, just the engine, FMFRR and BNRR zones are required or preferable. Specific burner designs using the Power Burner concept are illustrated below.

Power Burner Process and Design Drawings

The figures described below illustrate several process and apparatus configurations that utilize the Power Burner concept. These are not extensive, and other configurations and designs could be envisioned by one skilled in the art.

FIG. 11 presents a simple Power Burner process, where a single engine exhausts into the FMFRR and FLR reactors, with the optimal split of the exhaust depending on desired emissions and flame stability conditions to be achieved in the downstream exhaust. The hot exhaust from the engine, which could contain oxygen, flows into the FMFRR zone (equivalence ratio >1) where the addition of fuel (f) and air (a) may produce rich product gases and the hot engine exhaust may also flow into the FLR lean flame zones (equivalence ratio <1) created by a mixture of fuel (f) and air (a) simultaneously produce lean gases that may then be brought together in the BNRR burnout and NOx reduction zone (equivalence ratio <1). As shown, heat (Q) can be extracted and diluents (m) (e.g. recirculated flue gas, steam) added at various locations to control temperature. Also, a NOx reductant (e.g. NH3), or fuel (f) and air (a), can even be added in the burnout zone to optimize or imiprove emissions and combustion. The fuel and air coming into each zone can be premixed, near premixed or even nonpremixed, depending on fuel and application. In this application the emissions in the hot engine exhaust could be processed in the FMFRR, FLR and even BNRR flame zones, and reduced to low levels. Because, in some embodiments, only one of each of FMFRR, FLR and BNRR zones are utilized, turndown with this configuration is limited, particularly if air (a) is limited or zero at the full load condition. In alternate embodiments, any number of FMFRR, FLR, and BNRR zones may be provided. When the only oxidant is fixed engine exhaust, rich and lean zones can exceed stability limits as fuel flow is reduced to match process load. However, as more reactor zones are added to the Power Burner, opportunities for turndown flexibility are increased.

FIG. 12 presents a Power Burner process, including a single engine and six exhaust flows that flow to the five FMFRR, FLR and BNRR zones, plus an exhaust stream that bypasses all of the burner flame zones and enters the downstream process without modification. As in the FIG. 11 case, the exhaust flows can be partitioned to various reactors to optimize or improve processing for flame stability and minimum emissions. With multiple exhaust flows from the engine controlled independently, as burner load is reduced, the exhaust flow can be diverted from burner zones through the bypass to maintain the stability of flames. In another strategy, as the total fuel flow is reduced during turndown, the fuel can be completely diverted from one flame zone to another to better support flame stability in zones where fuel continues to flow. Through fuel diversion strategies, needed load turndown can be achieved at good flame stability conditions, with even constant engine exhaust flow rates. While similar effects can be achieved through engine exhaust diversion, it is a greater mechanical challenge to divert hot exhaust gases versus cold fuel flows. Therefore, the fuel flow diversion strategy may be more straightforward. In FIG. 12 the FMFRR zones are serially aligned and produce rich product gases and lean FLR flame zones are serially aligned and simultaneously produce lean gases that are then brought together in the BNRR burnout and NOx reduction zone. The purpose of having two serial FMFRR reactors may be to optimize or improve conditions in the first reactor for flame stability and optimize or improve conditions in the second reactor for NOx suppression and downstream emissions reductions. For example, the first reactor could be less fuel rich, for better flame stability and the second reactor could be more fuel rich for improved NOx control. Also, the purpose of having two serial FLR reactors may be to optimize conditions in the first reactor for early reaction and stability, while helping to ultimately ignite reactions in the second reactor that are optimized for NOx reduction. For example, the first reactor could be less fuel lean for good stability and the second reactor could be more fuel lean for improved NOx control. Furthermore, as shown, NH3 or other amine producing type species could be injected into the second FLR reactor to reduce NOx prior to the BNRR. This could be important for some fuels, particularly those with high bound nitrogen content. In this case, the initial NOx production, even at limited temperature, could be high. After further temperature reduction to approximately 1700 F, NH3 could be injected to reduce NOx. As shown, heat can be extracted and diluents (e.g. recirculated flue gas, steam) added at various locations to control temperature. Also, a NOx reductant (e.g. NH3), or fuel and air, can even be added in zones to optimize emissions and combustion. The fuel and air coming into each zone can be premixed, near premixed or even non-premixed, depending on fuel and application.

FIG. 13 presents a power burner process, where FMFRR zones may be aligned in parallel and produce rich product gases and FLR lean flame zones may be aligned in parallel and simultaneously produce lean gases that may then be brought together in the BNRR burnout and NOx reduction zone. As in FIG. 12, all of the reactors may be fed by engine exhaust with a path for engine exhaust to also bypass the burner. The amount of exhaust gas to each reactor can be varied to yield optimal stability and emissions, as required. Also, the fuel and air added to FMFRR reactors can be set at conditions to optimize stability and NOx control separately. Likewise, the FLR reactors may also be set to optimize or improve stability and NOx control separately. By extracting heat from these reactors separately and in parallel and mixing all products together in the BNRR, chemistry in the BNRR can be optimized or improved for minimal or reduced NOx at good combustion characteristics. As shown, heat can be extracted and diluents (e.g. recirculated flue gas, steam) added at various locations to control temperature. Also, a NOx reductant (e.g. NH3), or fuel and air, can even be added in zones to optimize emissions and combustion. The fuel and air coming into each zone can be premixed, near premixed or even non-premixed, depending on fuel and application. As the burner load is turned down, the amount of exhaust gas to reactors can be varied to avoid reactor instability at the reduced fuel flow and fixed engine flow. This exhaust flow could be diverted to the burner bypass. As noted above, this could require the diversion of hot exhaust. Another and easier strategy would be to completely divert the fuel flow from one reactor to another that continues to operate would then be more stable with the higher fuel flow at the lower load. This approach may be readily accomplished with two, or more, FMFRR or FLR reactors. Another strategy could be to switch operation of a FMFRR to FLR operation as load and fuel flows are reduced. For the zone fixed oxidant flow, by switching from rich to lean operation, fuel rate, or load, may be decreased by approximately one-half in that zone. Given that low NOx is achieved at either rich or lean conditions, this strategy may still result in low NOx. This shows the flexibility of the process to address load changes at good stability and emissions, even with constant engine exhaust flows.

FIG. 14 presents a power burner process, where FMFRR zones are aligned in parallel and produce rich product gases that are brought together in another FMFRR zone (equivalence ratio >1) and FLR fuel lean flame zones (equivalence ratio <1) are aligned in parallel and simultaneously produce lean gases that are brought together in another FLR lean reactor (equivalence ratio <1), FMFRR and FLR lean gases then brought together in the BNRR burnout and NOx reduction zone (equivalence ratio <1). As shown in FIG. 14, the engine exhaust may be divided into seven flows that may enter reactors and one flow that may bypass the burner and enter the process unmodified. The specific exhaust flows to reactors may be varied to optimize or improve stability and emissions. The FMFRR configuration may promote secondary reactions of fuel rich products to better control nitrogenous species formation ahead of the BNRR burnout zone for optimal or improved NOx control. This FLR configuration may obtain a uniform mix of gases for NH3 reductant reactions prior to final reaction in the BNRR burnout zone. This may be of particular interest for high bound nitrogen content fuels, where high FLR initial NOx might be expected. As shown, heat can be extracted and diluents (e.g. recirculated flue gas, steam) added at various locations to control temperature. Also, a NOx reductant (e.g. NH3), or fuel and air, can even be added in zones to optimize emissions and combustion. The fuel and air coming into each zone can be premixed, near premixed or even non-premixed, depending on fuel and application. The engine exhaust can act as an oxidizer if the oxygen level is high. In all cases the engine exhaust may have the ability to act as FGR and control flame temperature and NOx. As in other configurations, the emissions in the engine exhaust may be processed by reactor flames and emissions can be reduced. As in the FIG. 13 case, the exhaust flow can be diverted to maintain reactor flame stability as burner load and fuel flow are reduced. Also, the fuel flow can be diverted to accomplish a similar objective, without the need to control the hot engine exhaust flow. Lastly, the FMFRR can be switched to a FLR as the total fuel flow may be reduced with load. In this strategy, low NOx may be maintained as the fuel to a single zone and reactor heat load is approximately cut in half.

FIG. 15 presents a power burner process that is similar to that in FIG. 14 with the difference being in the use of multiple engines and multiple engine exhausts. In this case, as load is reduced, one of the engines could be shut down to reduce the engine exhaust impact on the reactors. This load following strategy could be in addition to those applied in the case of FIG. 14 described above. In contrast to the many reactors approach, as illustrated in FIG. 15, FIG. 16 shows the case with single engine, FMFRR and BNRR zones. As noted above, this case may preferably be implemented with fuel and air added at the FMFRR zone results in an overall fuel lean mixture in the BNRR zone. Multiple engines, FMFR and BNRR zone cases can also be considered.

In all of the above configurations, at least one of the FMFRR zones can be operated at an equivalence ratio in a preferable range of approximately 1.4 to 2.0 and one of the FLR lean zones can be operated at an equivalence ratio in a preferable range of approximately 0.5 to 0.7. Other ranges may be possible for the equivalence ratios for the FMFRR and FLR lean zones. Also, in the above configurations, the BNRR burnout zone can be operated at an equivalence ratio of less than 1.0 at a temperature in the range of approximately 1600 F to 1800 F. In addition, in all of the above configurations, the zones can be separated by solid walls or by aerodynamic means, including the use of the furnace gas or injected recirculated flue gas as a separating medium. In all of the above configurations, the engine exhaust may consist of a hot gas with some NOx, CO and unburned hydrocarbon emissions and oxygen levels from near zero to potentially over 21% for oxygen enriched cases. For reduced burner load, exhaust gas and fuel flow may be changed in various rich zones, with all FMFRR zones operating at an equivalence ratio in the range of approximately 1.4 to 2.0 and the FLR zones operating in the range of approximately 0.5 to 0.7. In alternate embodiments, the FMFRR zones and the FLR zones may operate at other ranges. It should also be noted that FMFRR and FLR zones can be converted to FLR or FMFRR zones as the load is reduced.

FIGS. 7 and 11 through 16 illustrated the Power Burner process configurations and highlighted the strategies to optimize burner stability and emissions control at full load design point as well as part load burner conditions. These potential Power Burner process conditions can be implemented in many different mechanical designs addressing different engine types and conditions and different burner process requirements. For illustrative purposes, FIG. 17 presents a Power Burner design for a 10.5 MMBtu/hr firetube boiler application that uses a 135 kWe power simple cycle microturbine. Both the microturbine and boiler burner may use natural gas fuel, and the microturbine flow may be sufficient to provide all of the oxidant needs of the burner at the full load condition. Therefore, this may be a challenging case when firetube boiler load must be reduced. As described above in the process description, the fuel diversion strategy may be implemented with this Power Burner design. However, the other described strategies could be considered for other designs. The illustrative design in FIG. 17 should not be considered limiting, and the many Power Burner process configurations can be implemented in a broad range of designs by individuals skilled in the art.

FIG. 17 gives a front view of the Power Burner, with the burner head that attaches to the boiler on the right and the microturbine that generates power on the left. The large diameter cylinder attached to the microturbine may be an inlet air filter. Air may be drawn into the microturbine through the compressor, where the air pressure is increased and then fuel may be added in the "silo" combustor attached to the bottom of the microturbine. The hot gas may be expanded in the turbine that drives both the compressor and attached generator, located on the left side of the microturbine. Exhaust from the microturbine may exit in the cylinder attached to the main burner aligned at a right angle to the microturbine exit. The tangential alignment of the microturbine exhaust may promote a cyclonic flow in the burner that may promote stability of the fuel rich reactor located on the axis. Rich reactor fuel may be provided by injection into the connecting duct, where fuel and air are rapidly mixed. Surrounding the rich reactor are four lean jets, shown as segments of an annular region located around the rich reactor. Each of these four lean jets may be fed by independently controlled fuel injectors that provide fuel at the needed level. At full load, the microturbine may be operating at a full 135 kWe and the burner may be operating at 10.5 MMBtu/hr, with the burner combustion products containing approximately 2% excess oxygen. As load is reduced, the fuel flow may be reduced with essentially a constant oxidizer flow supplied by the microturbine. For fixed fuel fractions to all zones, the rich reactor could become less rich and the lean reactors could become leaner until lean flames could become unstable. However, with the invention, as the change in mixture ratios reach stability limits, the fuel to one lean jet may be shut off, with the fuel then diverted to the remaining operational zones. This could then help stabilize the operating zones, thereby allowing further reductions in load. Beyond the next limit, the second lean jet fuel flow could be shut off and the fuel distributed to the remaining operating zones. Again, this would stabilize these remaining zones and allow load to be further reduced. This process may then be repeated twice more to allow the burner to be turned down further while still maintaining stability and emissions levels. The process may be repeated any number of times as desired. Finally, the rich zone fuel could be turned down and the rich zone shifted from rich to lean operation, which would reduce load by another factor of two. Through this process, a large burner turndown could be accomplished while still maintaining a fixed microturbine flow rate. This burner turndown process and resulting rich and lean zone equivalence ratios may be listed in Table 1. As shown, equivalence ratios may be within limits for stability as well as emissions control. Table 1 also gives conditions where all lean jets are turned off. Ultimately, both formerly rich and lean jets may be turned off and the process heat may be provided only by the microturbine that continues to operate at full load. However, as required, the microturbine load can be reduced to provide a turndown of 10 to 1 (i.e. 10% load case), which meets any burner requirement. In contrast to these good Power Burner results, the results for the case without the special Power Burner strategy shows that the burner could become unstable for a turndown of only 30%. This shows the benefit of the Power Burner invention.

While the above design in FIG. 17 illustrates how the Power Burner load following process works, other designs could be considered that accomplish the Power Burner processes as presented earlier in FIGS. 7, and 11 through 16. Another example is given in FIG. 18, where the engine exhaust may be oriented in line with the burner exit. FIG. 18 gives a side view of the Power Burner, with the burner head that attaches to the boiler on the right and the microturbine that generates power on the left. The large diameter cylinder attached to the microturbine is the inlet air filter. Air may be drawn into the microturbine through the compressor, where the air pressure may be increased and then fuel added in the "silo" combustor attached to the microturbine. The hot gas may be expanded in the turbine that may drive both the compressor and attached generator, located on the left side of the microturbine. Exhaust from the microturbine may exit in the multiple port eductor attached to the main burner fuel rich and fuel lean ports ahead of the burner head. Besides being able to entrain additional air into the burner to provide an oxidant for the added fuel in the burner, the eductor is designed to recover the flow energy in the turbine exhaust so that a separate motor driven blower is not required for the burner. This flow energy recovery offsets normal electric power requirements of the burner and adds to the benefits of the Power Burner system. Rich reactor fuel may be provided by injection into the centrally located multiple rich reactors, where fuel and air may be rapidly mixed. Surrounding the rich reactor are four lean jets, shown as large protruding jets located around the rich reactors. Each of these four lean jets may be fed by independently controlled fuel injectors that may provide fuel at the needed level. At full load, the microturbine may be operating at the full 135 kWe and the burner may be operating at over 10 MMBtu/hr, with some air educted into both fuel rich and lean ports. The burner combustion products may contain approximately 2% excess oxygen. As load is reduced, the educator may be throttled to reduce external air flow and fuel flow may be reduced with essentially a constant oxidizer flow supplied by the microturbine. For fixed fuel fractions to all zones, the rich reactor could become less rich and the lean reactors could become leaner until lean flames would become unstable. However, with the invention, as the change in mixture ratios reach stability limits, the fuel to one lean jet could be shut off, with the fuel then diverted to the remaining operational zones. This could then help stabilize the operating zones, thereby allowing further reductions in load. Beyond the next limit, the second lean jet fuel flow could be shut off and the fuel distributed to the remaining operating zones. Again, this may stabilize these remaining operating zones and allow load to be further reduced. This process may then be repeated twice more to allow the burner to be turned down further while still maintaining stability and emissions levels. Finally, the rich zone fuel could be turned down and the rich zone shifted from rich to lean operation, which could reduce load by another factor of two. Through this process, a large burner turndown could be accomplished while still maintaining a fixed microturbine flow rate. As described above, this burner turndown process and resulting rich and lean zone equivalence ratios are listed in Table 1. As shown, equivalence ratios may be within limits for stability as well as emissions control. Table 1 also gives conditions where all lean jets are turned off. Ultimately, both formerly rich and lean jets are turned off and the process heat is provided only by the microturbine that continues to operate at full load. However, as required, the microturbine load can be reduced to provide a turndown of 10 to 1 (i.e. 10% load case), which meets any burner requirement. In contrast to these good Power Burner results, the results for the case without the special Power Burner strategy shows that the burner could become unstable for a turndown of only 30%. This shows a benefit of the Power Burner invention.

As described above, the Power Burner can also utilize only engine, FMFRR and BNRR zones, without the need for FLR zones. FIG. 19 illustrates a possible design for this case. As shown, the engine exhausts to a chamber where the FMFRR zone is located. The engine exhaust provides some oxidant for the fuel that is injected into the FMFRR zone. In addition, as with other FMFRR cases, air may be added to the mixture as well as FGR diluents from the recycled boiler exhaust and even additives. This creates favorable conditions for NOx and CO control. Products from the FMFRR zone may then mix with the remaining engine exhaust, which may bypass the FMFRR, in the downstream BNRR zone to completely oxidize any remaining fuel components and produce a hot oxygen rich gas for the boiler that may be optimal for boiler heat transfer and efficiency, as well as being low in emissions. As with the other cases, the FMFRR fuel and oxidant rate can be adjusted with load to maintain stability and low emissions as load is decreased.

These design examples show the flexibility of the BBEST process to meet different needs at good stability, emissions and turndown potential. While not illustrated, many other designs can be envisioned by those skilled in the art.

Any description herein of optimized conditions may also refer to improved or desirable conditions. Improved conditions may include conditions that have been improved over using typical systems known in the art.

Any characteristics, components, configurations, steps, or features as known in the art may be combined, modified, or incorporated by the invention. See, e.g., U.S. Pat. No. 6,485,289, which is hereby incorporated by reference in its entirety.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

TABLE 1

Comparison of Power Burner and Conventional Low NOx Burner Turndown Potentials

| POWER BURNER APPROACH | | | CONVENTIONAL LOW NOX | | |
|---|---|---|---|---|---|
| LOAD % | EQUIV RICH | EQUIV LEAN | LOAD % | EQUIV RICH | EQUIV LEAN |
| 1 | 1.666667 | 0.617978 | 1 | 1.666667 | 0.617978 |
| 0.9 | 1.558392 | 0.577831 | 0.9 | 1.558392 | 0.577831 |
| 0.8 | 1.46504 | 0.604572 | 0.8 | 1.333333 | 0.494382 |
| 0.7 | 1.436912 | 0.618481 | UNSTABLE | | |
| 0.6 | 1.493926 | 0.55689 | UNSTABLE | | |
| 0.5 | 1.447979 | OFF | UNSTABLE | | |
| 0.4 | 0.55 | 0.51 | UNSTABLE | | |
| 0.3 | 0.5 | OFF | UNSTABLE | | |
| 0.22 | OFF | OFF | | | |
| 0.1 | OFF | OFF | | | |

What is claimed is:

1. A system, comprising:
   at least one engine capable of producing power and an engine exhaust gas;
   a first reaction zone configured to receive at least a portion of the engine exhaust gas from the at least one engine and configured to combust fuel and air having an equivalence ratio of more than one, thereby generating a first product;
   a second reaction zone configured to receive at least a portion of the engine exhaust gas from the at least one engine and configured to combust fuel and air having an equivalence ratio of less than one, thereby generating a second product; and
   a burnout zone configured to receive the first product and second product, and mix and react the first and second products, thereby generating a burnout zone exhaust with reduced NOx levels;

wherein in use the burnout zone exhaust produces a flame satisfying a burner load; and wherein in use the combustion of fuel and air in the first and/or second reaction zones is modulated to maintain flame stability in response to changes in the burner load and while the at least one engine is set to operate at a speed that optimizes the at least one engine's power output and efficiency.

2. The system of claim 1 that has multiple first and second reaction zones having the capability to modulate, divert or turn off fuel and/or air to maintain flame stability in response to changes in the burner load.

3. The system of claim 2 wherein the multiple first reaction zones and/or multiple second reaction zones are provided in series.

4. The system of claim 2 wherein the multiple first reaction zones and/or multiple second reaction zones are provided in parallel.

5. The system of claim 2 that has multiple parallel and serial first reaction zones and/or multiple parallel and serial second reaction zones.

6. The system of claim 1 wherein the first reaction zone is a fuel rich zone and the second reaction zone is a fuel lean zone.

7. The system of claim 1 wherein the first reaction zone, the second reaction zone, and/or the burnout zone have separate air and fuel introduction, heat extraction, cooled furnace gas introduction, and/or partial engine exhaust gas introduction.

8. The system of claim 1, wherein the engine exhaust gas exits into an eductor to recover flow energy in a turbine exhaust and entrain additional air into the first and the second reaction zones.

9. The system of claim 1 wherein the burnout zone, the first reaction zone and/or the second reaction zone are configured to receive amine species, exhaust gas, fuel, and/or air and cooled flue gas, steam or another diluent to control temperature.

10. The system of claim 1 further comprising an additional engine configured to produce power and an engine exhaust gas in communication with an additional reaction zone configured to generate an additional product that is received by the burnout zone.

11. The system of claim 1 wherein the at least one engine is a microturbine.

12. The system of claim 1 wherein the at least one engine has a tangential alignment of the engine exhaust gas, thereby promoting a cyclonic flow in the system.

13. The system of claim 1 wherein the first reaction zone is provided within a rich reactor surrounded by a plurality of lean jets.

14. The system of claim 1, wherein the at least one engine is set to operate at a speed that produces a relatively fixed exhaust flow rate.

15. The system of claim 1, wherein the at least one engine is set to operate at a constant speed.

16. The system of claim 1, wherein energy in the engine exhaust gas is used to entrain/educt additional air into the first and the second reaction zones and/or exhaust gas to provide an oxidant for added fuel into the first and the second zones.

17. A system, comprising:
at least one engine capable of producing power and engine exhaust gases;
a fuel rich zone configured to receive at least a portion of the engine exhaust gases from the at least one engine, and configured to receive and combust fuel and air having an equivalence ratio of more than one, thereby generating a product;
a burnout zone configured to receive the product, and mix and react the product with the engine exhaust gases, thereby generating an exhaust with reduced NOx levels;
wherein in use a burnout zone exhaust produces a flame satisfying a burner load; and
wherein in use the combustion of fuel and air in the fuel rich zone is modulated to maintain flame stability in response to changes in the burner load and while the at least one engine is set to operate at a speed that optimizes the at least one engine's power output and efficiency.

18. The system of claim 17 wherein the fuel rich zone and/or burnout zone is configured to further receive amine species, fuel, or air and cooled flue gas, steam or another diluent to control temperature.

19. The system of claim 17, wherein energy in the engine exhaust gas is used to entrain/educt additional air into the fuel rich and the burnout zones and/or exhaust gas to provide an oxidant for added fuel into the fuel rich and the burnout zones.

20. A method for electric power and heat production, comprising:
receiving, at a reaction zone, at least a portion of an engine exhaust gas from at least one engine producing electric power and the engine exhaust gas;
combusting, at the reaction zone, fuel and air having an equivalence ratio of more than one, thereby generating a product;
receiving, at a burnout zone, the product and an additional input, and mixing and reacting, at the burnout zone, the product and the additional input, thereby generating a burnout zone exhaust with reduced NOx levels;
wherein the burnout zone exhaust produces a flame for satisfying a burner load; and
wherein the combustion of fuel and air in the burnout zone is modulated to maintain flame stability in response to changes in the burner load and while the at least one engine is set to operate at a speed that optimizes the at least one engine's power output and efficiency.

21. The method of claim 20 wherein the reaction zone is a first reaction zone and the additional input is a product from a second reaction zone receiving at least a portion of the engine exhaust gas from the at least one engine, and configured to combust fuel and air having an equivalence ratio of less than one.

22. The method of claim 21, wherein amine species, fuel, and/or air is added to the burnout zone.

23. The method of claim 21 wherein at least a portion of the engine exhaust gas, fuel, or air is diluted with cooled flue gas, steam or another diluent to control temperature.

24. The method of claim 20 wherein the additional input is an amine species, engine exhaust, fuel, and/or air.

25. The method of claim 20 wherein at least a portion of the engine exhaust gas, fuel, or air is diluted with cooled flue gas, steam or another diluent to control temperature.

26. The method of claim 20, wherein energy in the engine exhaust gas is used to entrain/educt additional air into the reaction and the burnout zones and/or exhaust gas to provide an oxidant for added fuel into the reaction and the burnout zones.

* * * * *